US010195772B2

(12) United States Patent
Duclos et al.

(10) Patent No.: US 10,195,772 B2
(45) Date of Patent: Feb. 5, 2019

(54) PREFORM MOLDING UNIT EQUIPPED WITH A ROTATABLE CORE HOLDER

(71) Applicant: SIDEL PARTICIPATIONS, Octeville sur Mer (FR)

(72) Inventors: Yves-Alban Duclos, Octeville sur Mer (FR); Gilles Helix, Octeville sur Mer (FR); Michel Norture, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 177 days.

(21) Appl. No.: 15/123,178

(22) PCT Filed: Jan. 19, 2015

(86) PCT No.: PCT/FR2015/050124
§ 371 (c)(1),
(2) Date: Sep. 1, 2016

(87) PCT Pub. No.: WO2015/132487
PCT Pub. Date: Sep. 11, 2015

(65) Prior Publication Data
US 2017/0072606 A1   Mar. 16, 2017

(30) Foreign Application Priority Data
Mar. 3, 2014   (FR) ...................................... 14 51696

(51) Int. Cl.
*B29C 45/06*   (2006.01)
*B29C 45/40*   (2006.01)
*B29K 105/00*   (2006.01)

(52) U.S. Cl.
CPC .............. *B29C 45/06* (2013.01); *B29C 45/40* (2013.01); *B29C 2045/065* (2013.01);
(Continued)

(58) Field of Classification Search
CPC ........ B29C 45/4435; B29C 2045/4442; B29C 2045/4078; B29C 2045/065; B29C 45/06;
(Continued)

(56) References Cited

U.S. PATENT DOCUMENTS 4,310,282 A * 1/1982 Spurr ..................... B29C 45/40
294/106
4,470,796 A   9/1984 Stroup et al.
(Continued)

FOREIGN PATENT DOCUMENTS

EP           2 585 273 B1   10/2014
WO      2014/111902 A2     7/2014

OTHER PUBLICATIONS

International Search Report, dated Apr. 29, 2015, from corresponding PCT Application.

*Primary Examiner* — Robert B Davis
(74) *Attorney, Agent, or Firm* — Young & Thompson

(57) ABSTRACT

Unit (4) for molding preforms (2) that each have a body (15) and a neck (17) extending the body (15), this unit (4) including: a frame (19),—a mold holder (27) secured to the frame (19) and carrying at least one mold body (29) having the impression of the body (15) of the preform (2); mobile equipment (60) including a carriage (61) and a core holder (62) carrying at least one primary core (64A) and one secondary core (64B), the carriage (61) being mounted so as to be movable with respect to the frame (19) between a molding position and a demolding position, this core holder (62) being rotatable with respect to the carriage (61), in the demolding position of the latter, about a rotation axis parallel to the molding axis in order to transpose the cores (64A, 64B).

17 Claims, 29 Drawing Sheets

(52) U.S. Cl.
CPC .............................. *B29C 2045/4068* (2013.01);
*B29K 2105/253* (2013.01); *B29K 2105/258* (2013.01)

(58) Field of Classification Search
CPC .. B29C 45/40; B29C 2045/4068; B29C 45/10
See application file for complete search history.

(56) References Cited

U.S. PATENT DOCUMENTS

| | | | | |
|---|---|---|---|---|
| 4,634,366 | A * | 1/1987 | Brun | B29C 45/26 264/328.14 |
| 5,643,620 | A * | 7/1997 | Brun, Jr. | B29C 45/125 264/297.2 |
| 5,662,856 | A * | 9/1997 | Wunderlich | B29C 45/02 264/297.2 |
| 8,858,216 | B2 * | 10/2014 | Zoppas | B29C 47/0023 425/526 |
| 9,469,062 | B2 * | 10/2016 | Zoppas | B29B 11/08 |
| 2007/0018355 | A1 | 1/2007 | Steele | |

* cited by examiner

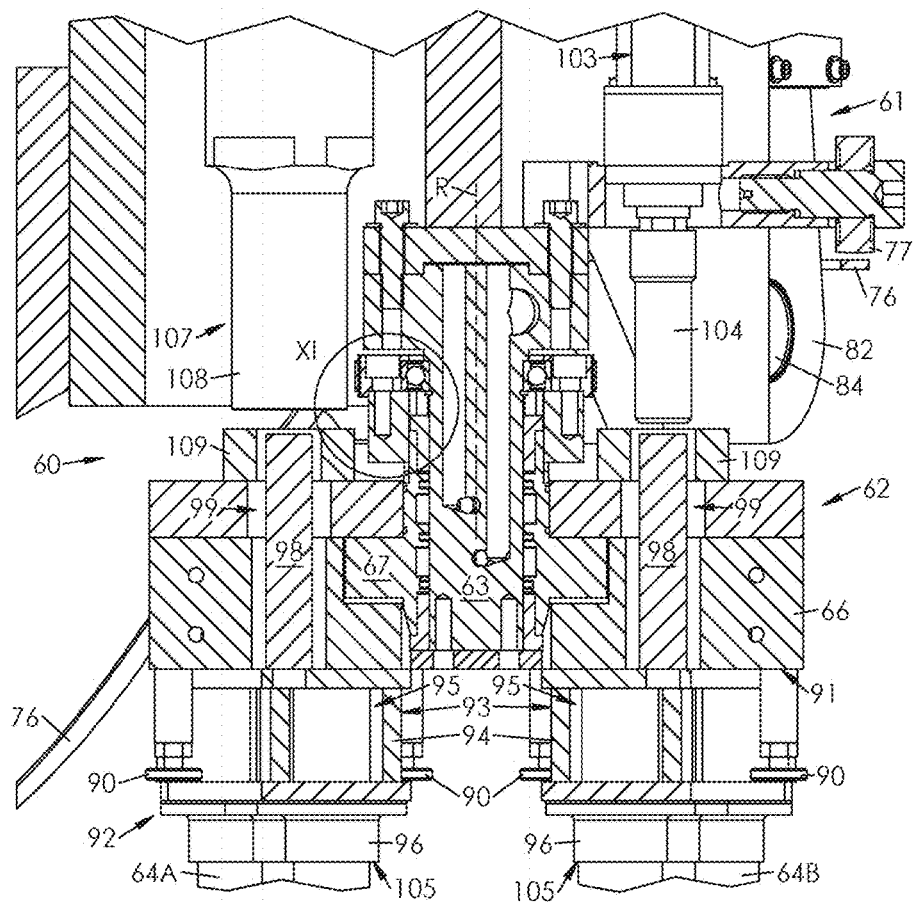
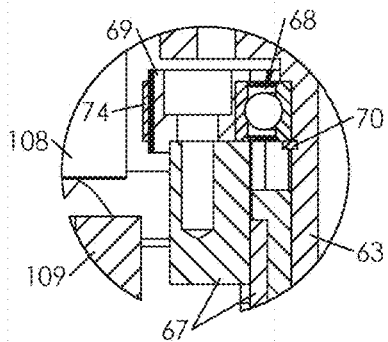

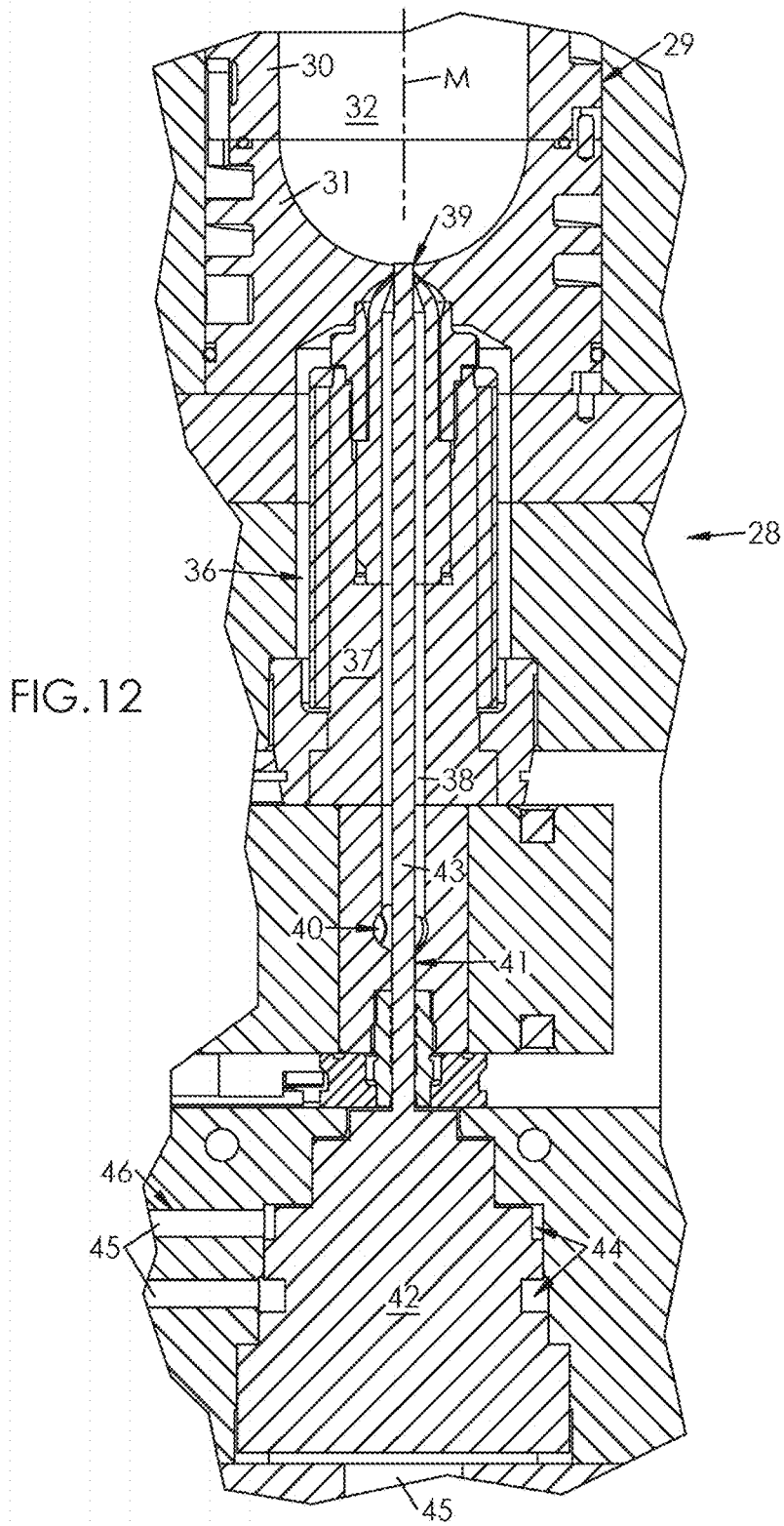

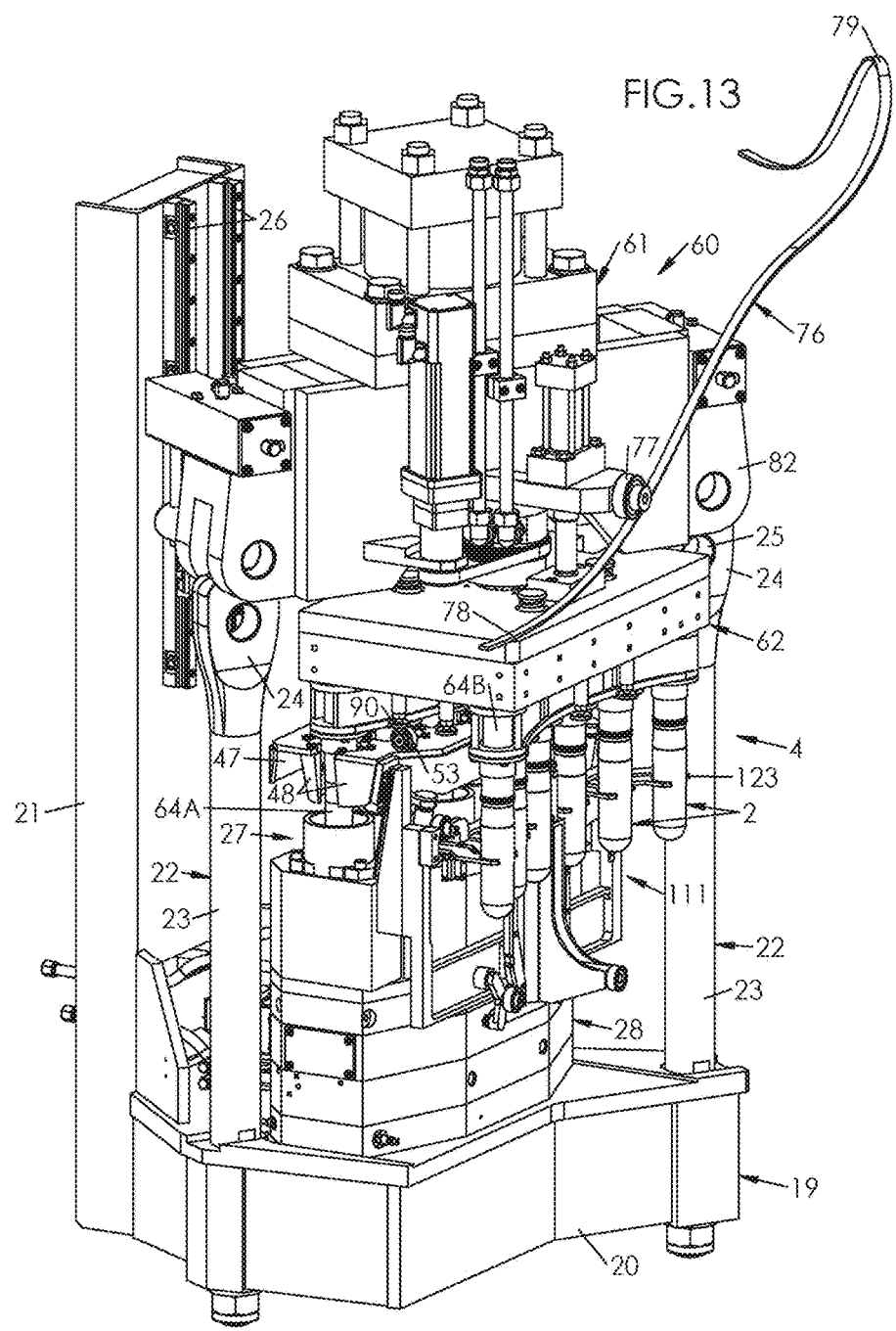

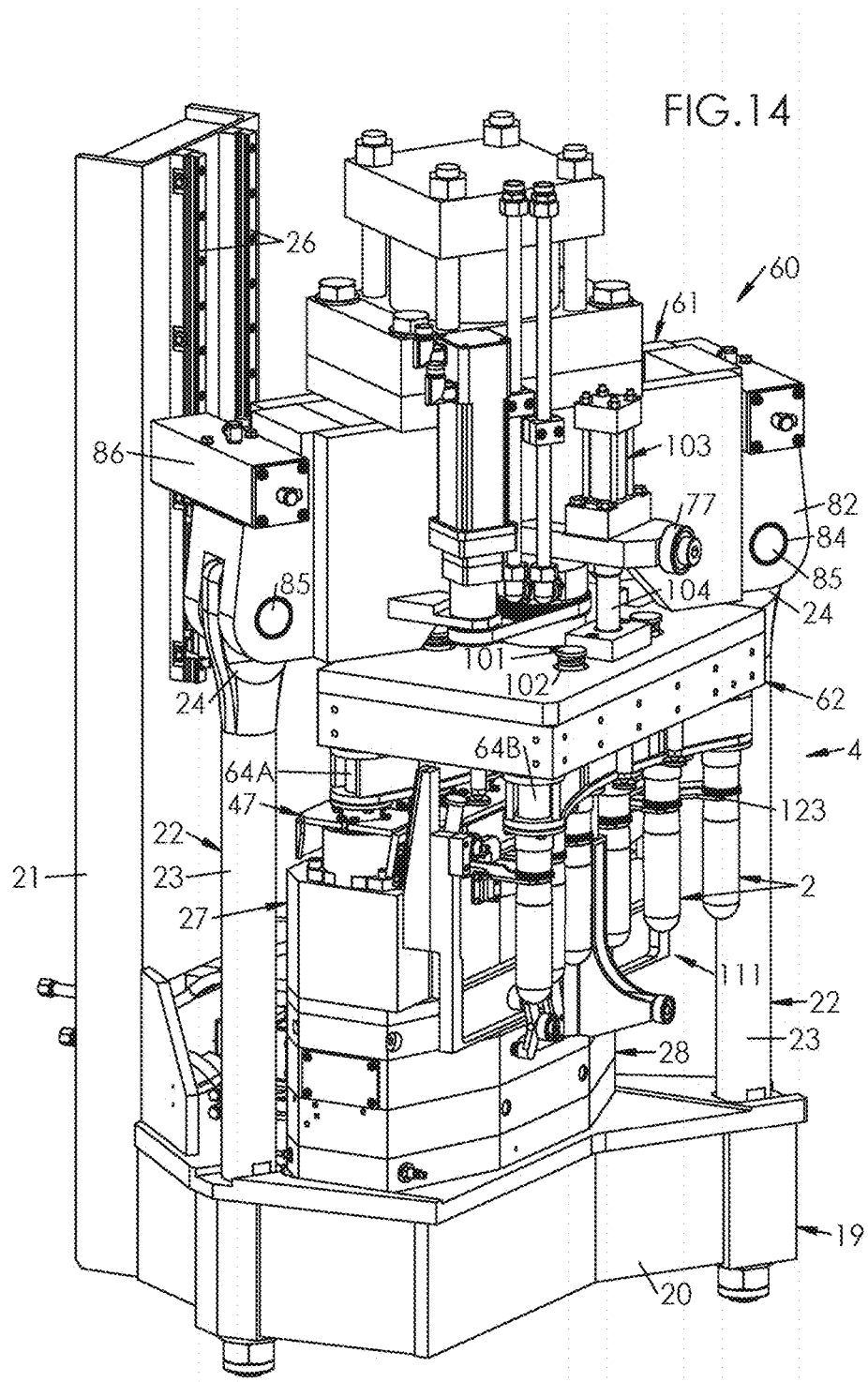

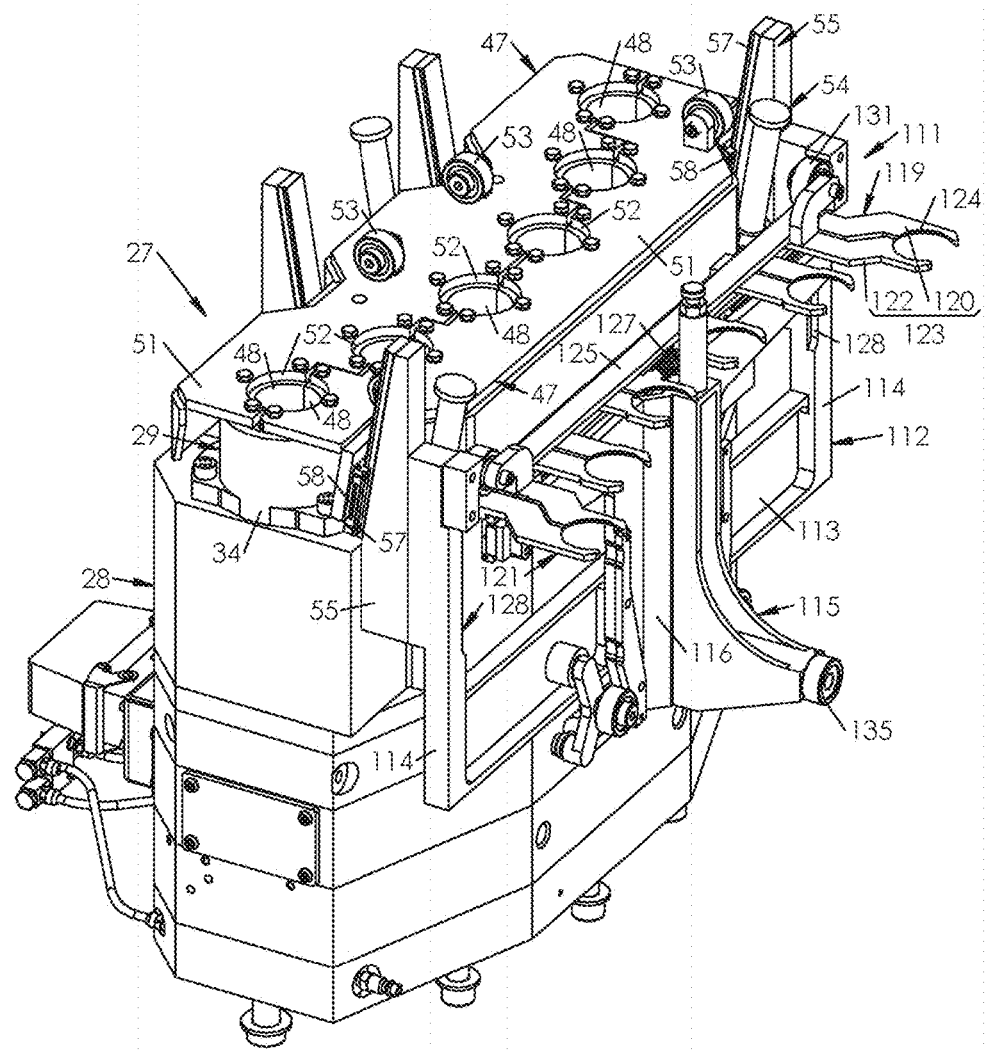

PREFORM MOLDING UNIT EQUIPPED WITH A ROTATABLE CORE HOLDER

The invention relates to the field of molding preforms made of plastic material designed for the manufacturing of containers (in particular bottles) by blow molding or stretch blow molding.

Such a preform generally comprises a body of cylindrical shape and a neck in the extension of the body at one upper end of the latter. At an opposite lower end, the body is closed by a dome-shaped bottom.

A preform of this type is conventionally obtained by injection of a plastic material (such as PET) into a mold bearing the imprint of the preform. The plastic material, initially discharged in the form of solid granules in a hopper, is delivered in the form of hot paste by an injection screw with a molding machine equipped with a number of molds, into which the pasty plastic material is injected. Ordinarily, each mold comprises a mold body bearing the imprint of an outer face of the body of the preform, and an oblong core bearing the imprint of an inner face of the body of the preform.

To form the preform, the material is injected between the mold body and the core, which is then withdrawn to make possible the ejection of the preform.

This technique is described in the European patent application EP 2 585 273 (SIPA), which describes a molding machine that is equipped with a number of individual units mounted on a carrousel and each designed to ensure the molding of a preform. It is indicated in this document that the machine is designed to equip an integrated (or combined) production line, in which the containers are directly formed from preforms that have just been molded and not from preforms molded in advance and temporarily stored.

The main drawback of this machine is its small ratio of pace/number of molds. As FIG. 5 of the application EP 2 585 273 actually shows, it is necessary—in order to ensure the flow rate required by the manufacturing of containers (several tens of thousands per hour, with 50,000 being a standard)—to mount a multitude of individual molding units on the same carrousel supplied by a common source of material. The result is an oversizing of the carrousel, whereas the pace constraints make it rotate at high speed.

A rotary joint ensures the distribution of the material from the material source toward each molding unit, but, taking into account the large number of molding units, this rotary joint is complex to produce and difficult to maintain.

A first objective is to propose a molding unit that makes it possible to increase the flow rates of production of preforms while limiting the number of parts and the space requirement.

A second objective is to propose a molding machine that can easily be integrated into a container manufacturing line.

For this purpose, in the first place, a unit for molding preforms made of plastic material is proposed, with each preform having a body and a neck in the extension of the body, with this unit comprising:

A frame,
A mold holder that is integral with the frame and that carries at least one mold body bearing the imprint of an outer face of the body of the preform, with this mold body extending around a molding axis;
A movable apparatus including a carriage and at least one oblong core bearing the imprint of an inner face of the body of the preform, with the carriage being mounted to move in relation to the frame between:
  A molding position in which the core is housed in the mold body, and
  A demolding position in which the core is axially separated from the mold body,
with this movable apparatus also comprising a core holder mounted on the carriage, with this core holder carrying at least one primary core and one secondary core and being movable in rotation in relation to the carriage, in the demolding position of the latter, around an axis of rotation that is parallel to the axis of molding, between:
  A first alignment position in which the primary core extends in the alignment of the mold body while the secondary core is offset in relation to the mold body, and
  A second alignment position in which the primary core and the secondary core are transposed.

This molding unit consequently makes it possible to pool a portion of the equipment for the formation of preforms. More specifically, the same mold body is common to two cores, which makes it possible, with equal production, to reduce the number of molding units by a factor of at least 30%, thus improving productivity.

Various additional characteristics are provided, by themselves or in combination:

The molding unit comprises a shoring-up device including a stop mounted to move between an active position in which the stop rests against the core holder perpendicular to the mold holder, and an inactive position in which the stop is separated from the core holder;
The carriage is mounted in translation in relation to the frame;
The mold holder includes a number of mold bodies, and the core holder carries a number of primary cores and a number of secondary cores;
The mold holder carries a row of mold bodies;
The mold bodies are placed side by side along a curved line;
The molding unit comprises a pair of drawers, each carrying at least one neck half-ring having an inner face bearing the imprint of the neck of a preform and a tapered outer face, each drawer being movable in relation to the mold holder between a molding position in which the or each half-ring is housed in a tapered reserve formed projecting over the mold body, and a demolding position in which the or each half-ring is separated from the tapered reserve;
Each drawer is mounted in translation in relation to the mold holder on a guiding axis that is inclined in relation to the molding axis;
The molding unit comprises, for each drawer, a return spring mounted parallel to the guiding axis and which drives the drawer toward its demolding position, each drawer carries a roller, and the core holder carries a support element that, during the movement of the core holder toward its molding position, pushes, by application against the roller, the drawer back towards its molding position in opposition to the return spring;
The molding unit comprises a device for uncovering each molded preform, in a demolding position of the core holder;
This uncovering device comprises:
  An extractor equipped with a pusher mounted in translation on each core, with this extractor being movable in translation in relation to each core between a rest position and an extraction position,
  A peg mounted in translation in relation to the core holder, between a rest position, in which the peg is separated from the extractor and makes it possible for the latter to adopt its rest position, and an extraction position, in which the peg rests against the extractor and places the latter in its extraction position to disengage the molded preform from the core.

The molding unit comprises a device for gripping molded preforms extracted from the core holder, with this gripping device comprising a first comb carrying at least one first jaw and a second comb carrying at least one second jaw defining, with the first jaw, a clamp for gripping a preform, with the combs being mounted to move in relation to one another between a gripping position in which the jaws are drawn toward one another, and a release position in which the jaws are separated;

The gripping device comprises a return spring that drives the combs toward the gripping position, the mold holder carries a pair of cam grooves, and each comb carries a cam follower that works with a cam groove of which a narrow cross-section places the combs in their release position in opposition to the return spring.

In the second place, a machine for molding preforms made of plastic material is proposed, which machine comprises:

A rotating carrousel,

A number of molding units such as the one presented above, mounted on the carrousel, An extruder, A rotary joint equipped with an input connected to the extruder, and a number of outputs each connected to a molding unit by a feed pipe for delivering the plastic material there.

According to a particular embodiment, this machine also comprises a device for dosimetric injection of the material coming from the extruder, with this dosimetric injection device comprising a three-way valve inserted in the feed pipe, a metering cylinder, a plunger mounted in translation in the metering cylinder, a jack for controlling the translation of the plunger, and a jack for controlling the position of the valve.

Other objects and advantages of the invention will become evident from the description of an embodiment, given below with reference to the accompanying drawings in which:

FIG. 1 is a perspective view showing a machine for molding preforms made of plastic material, equipped with a carrousel on which are mounted a number of molding units of the preforms with, in insets, details of the machine: on the left, a rotary joint ensuring the distribution of the material; on the right, a dosimetric injection device ensuring the injection of a predetermined dose of material into each mold;

FIG. 10 is a detail transversal cutaway view, in another cutting plane than that of FIG. 8, of the molding unit of FIG. 2, and illustrating a control system of the rotation of the core holder;

FIG. 11 is a detail inset of FIG. 10, according to the insert XI;

FIG. 12 is a detail cutaway view of the molding unit of FIG. 2, showing a system for injection of the material;

FIG. 13 is a view similar to FIG. 2, showing the molding unit during the lowering of the carriage toward a molding position;

FIG. 14 is a view similar to FIG. 13, showing the molding unit in the molding position;

FIG. 15 is a view similar to FIG. 3, showing the mold holder of the molding unit in the molding position of FIG. 14;

Figure 1:
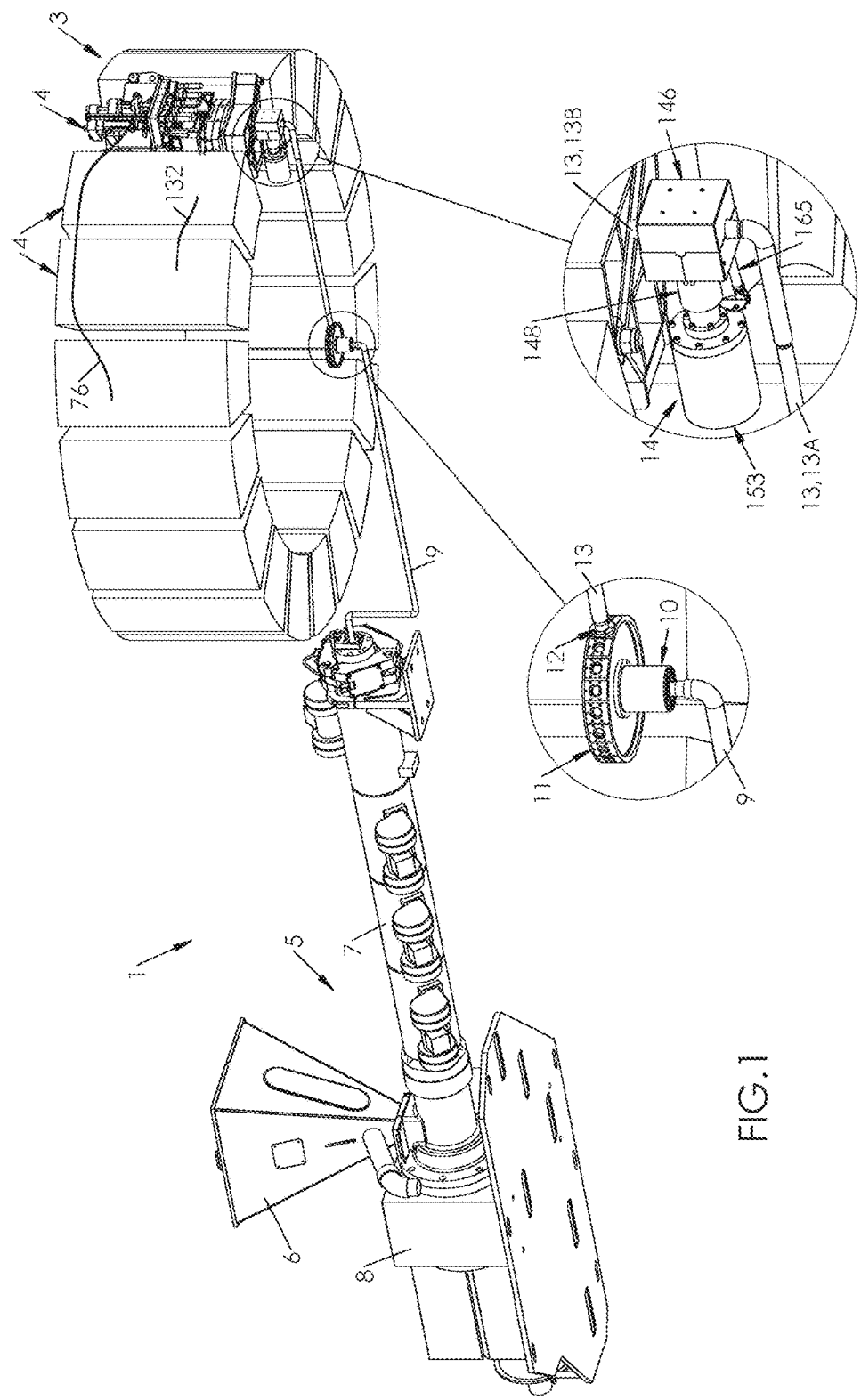

FIG. 1 shows a machine 1 for molding preforms of containers (in particular bottles) from preforms 2 (visible in particular in FIG. 2) made of plastic material such as polyethylene terephthalate (PET). This machine 1 comprises, in the first place, a rotating carrousel 3 (of which the carrying structure was not shown), and a number of molding units 4 of the preforms 2, all identical, mounted side by side on the carrousel 3 and driven in rotation with the latter.

In the second place, the machine 1 comprises an extruder 5 that is arranged to provide the plastic material continuously to the molding units 4. This extruder 5 comprises a hopper 6, into which the plastic material is discharged in the form of solid granules, and a cylinder 7 in which is mounted an endless extrusion screw driven in rotation by a motor 8.

The hopper 6 empties into the cylinder 7 at an end that is upstream from the latter. At an opposite downstream end, the cylinder 7 empties into a pipe 9 for connecting the extruder 5 to an input 10 of a rotary joint 11, which ensures the distribution of the material obtained from the extruder 5 toward all of the molding units 4. For this purpose, the joint 11 is equipped with a series of peripheral outputs 12 equal in number to the molding units 4. On each of these outputs 12 is branched a feed pipe 13 that connects the joint 11, via a dosimetric injection device 14 that will be described below, to a molding unit 4 to deliver there the plastic material coming from the extruder 5.

Each preform 2 comprises an essentially cylindrical body 15 of revolution around an axis A, closed by a hemispherical dome 16, and a neck 17 that is open into the extension of the body 15 opposite the dome 16. The neck 17 ends, opposite the body 15, by an annular face 18 (visible in the detail inset, at the top right in FIG. 8), defining a lip for the container that will be formed from the preform 2.

Figure 2:
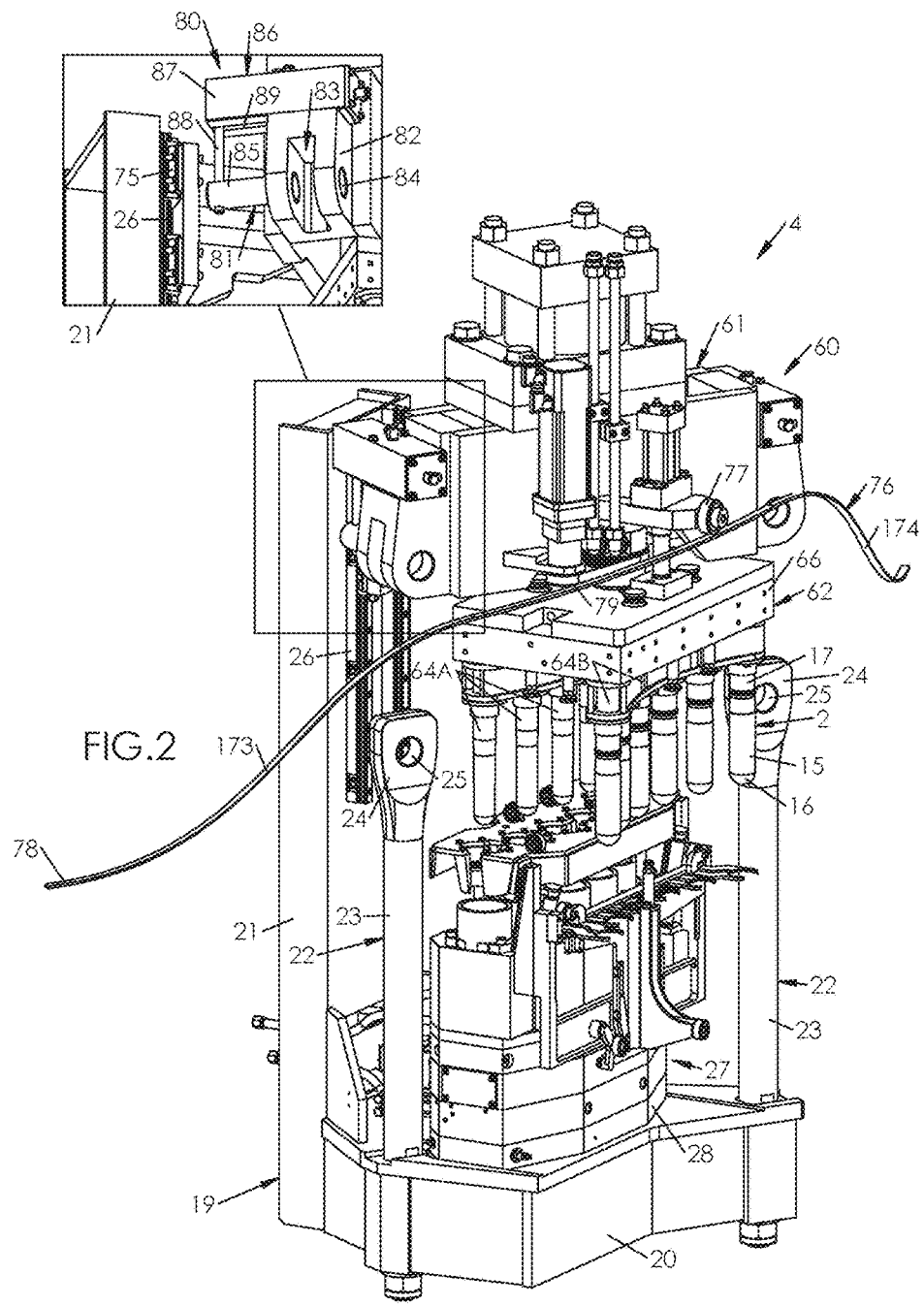
FIG. 2 is a perspective view showing a molding unit equipping the machine of FIG. 1, in a position for preparation with molding of an inner row of preforms with, in an inset, a detail, along another angle of view, centered on a locking system.

Each unit 4 for molding preforms 2 comprises, in the first place, a frame 19 by which the molding unit 4 is mounted on the carrying structure of the carrousel 3. As illustrated in FIG. 2, the frame 19 comprises a base 20 that extends essentially horizontally (in a normal position of operation of the molding unit 4), and a bracket 21 that is integral with the base 20 and that extends vertically projecting from the latter (cf. in particular FIG. 2).

The frame 19 further comprises a pair of cylindrical locking columns 22, also integral with the base 20 and that extend vertically projecting from the latter. Each column 22 comprises a cylindrical body 23, and, at an upper end of the latter, opposite to the base 20, a flattened head 24 pierced by a through hole 25 (FIG. 2).

The frame 19 also comprises a pair of guide rails 26 that are integral with the bracket 21 and that extend vertically from an upper end of the latter (FIG. 2).

The molding unit 4 comprises, in the second place, a mold holder 27 including a mold holder block 28 that is integral with the frame 19 by being attached to the base 20 (for example by screwing) between the columns 22.

The mold holder block 28 integrates at least one mold body 29 (visible in cutaway in FIG. 8) that has a cylindrical lateral wall 30 and a hemispherical mold bottom 31 that are superposed and that together define a cavity 32 bearing the imprint of an outer face 33 of the body 15 of the preform 2.

Figure 18:
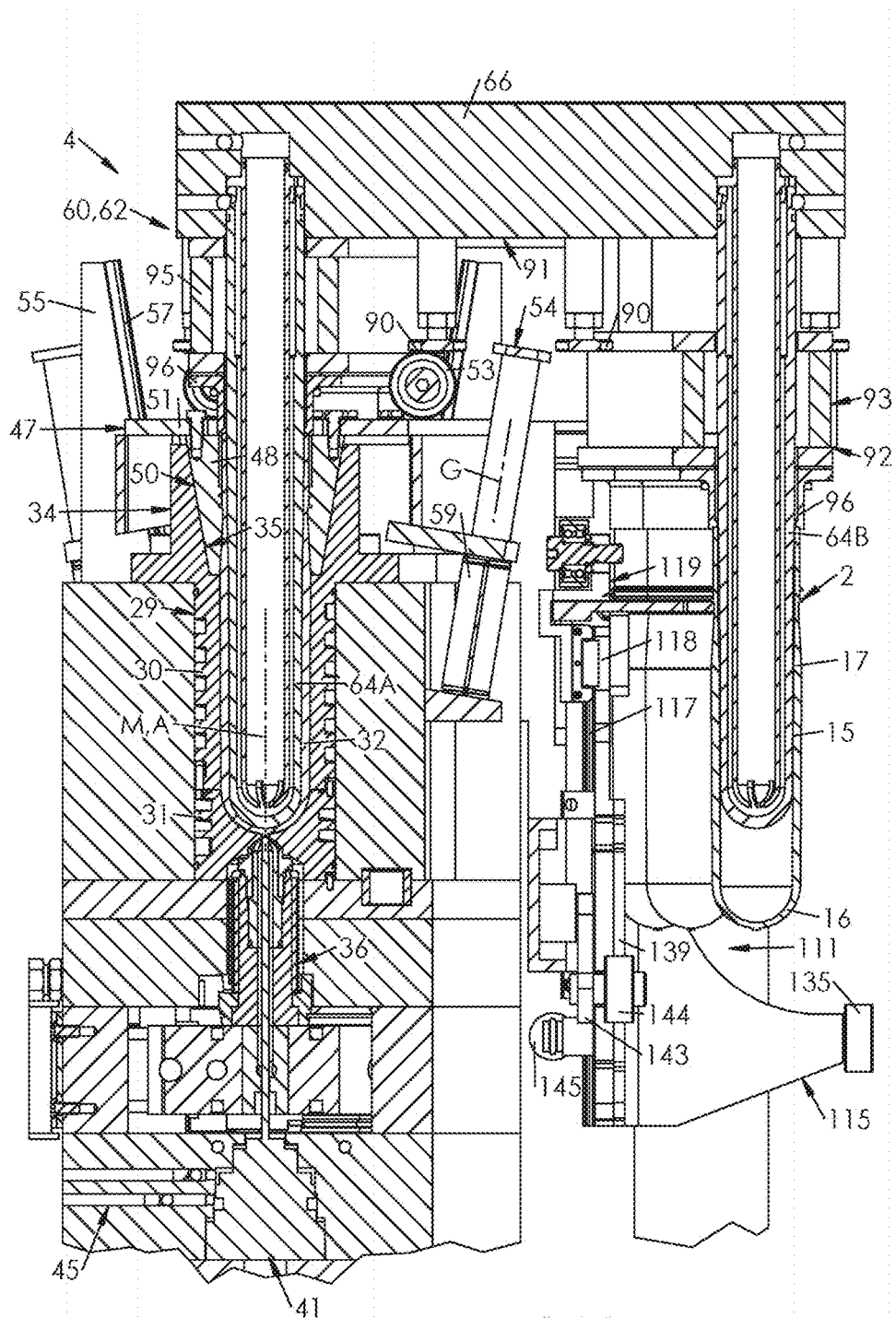
FIG. 18 is a transversal cutaway view similar to FIG. 16, showing the molding unit in the position of FIG. 17 and illustrating the molding of the preforms.
Figure 19:
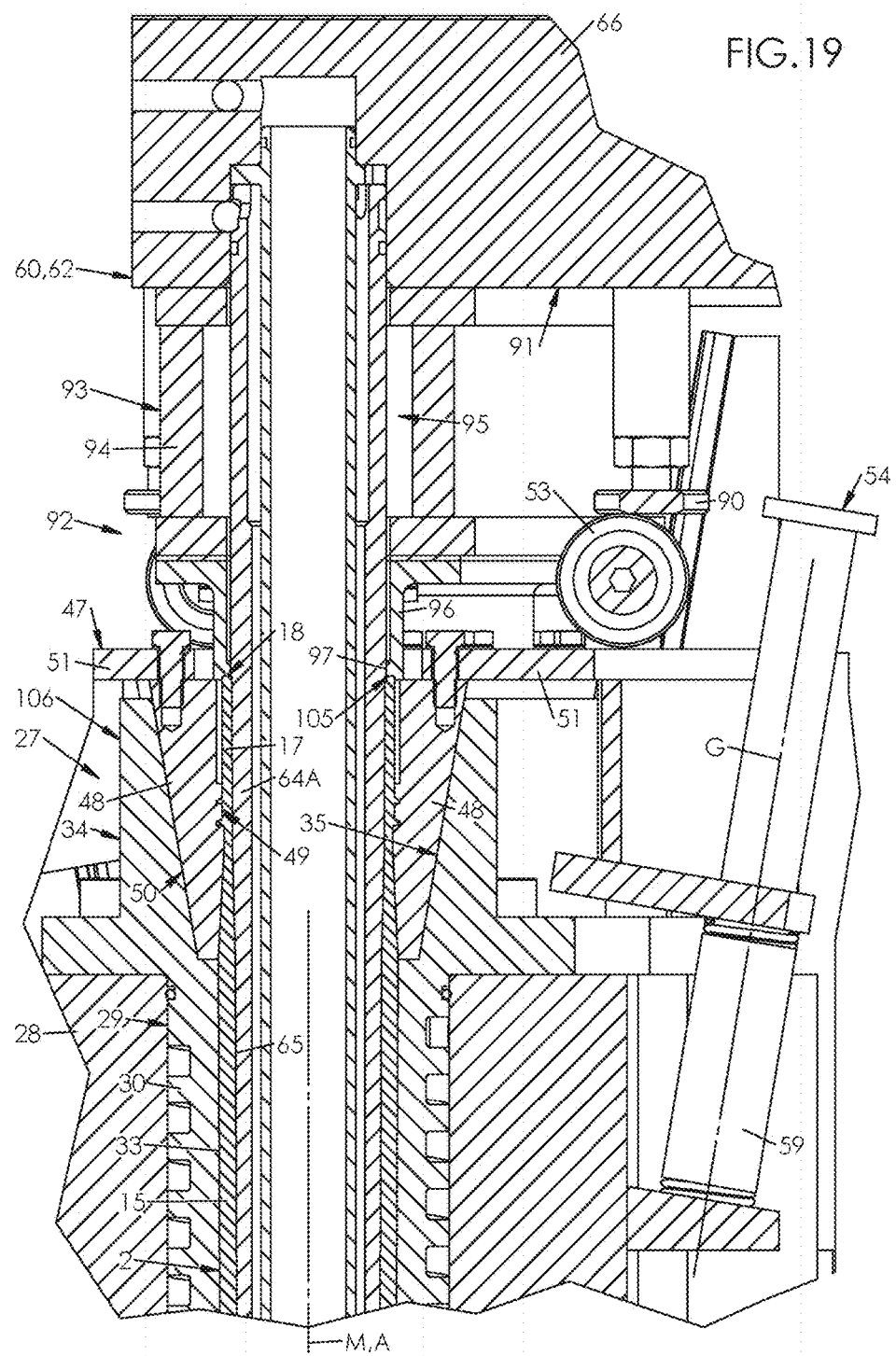
FIGS. 19 and 20 are detail cutaway views taken of FIG. 18 and illustrating the molding of a preform.

The mold body 29 extends around a molding axis M that corresponds to the central axis A of the preform 2 to be formed (see in particular FIGS. 18 and 19).

Figure 8:
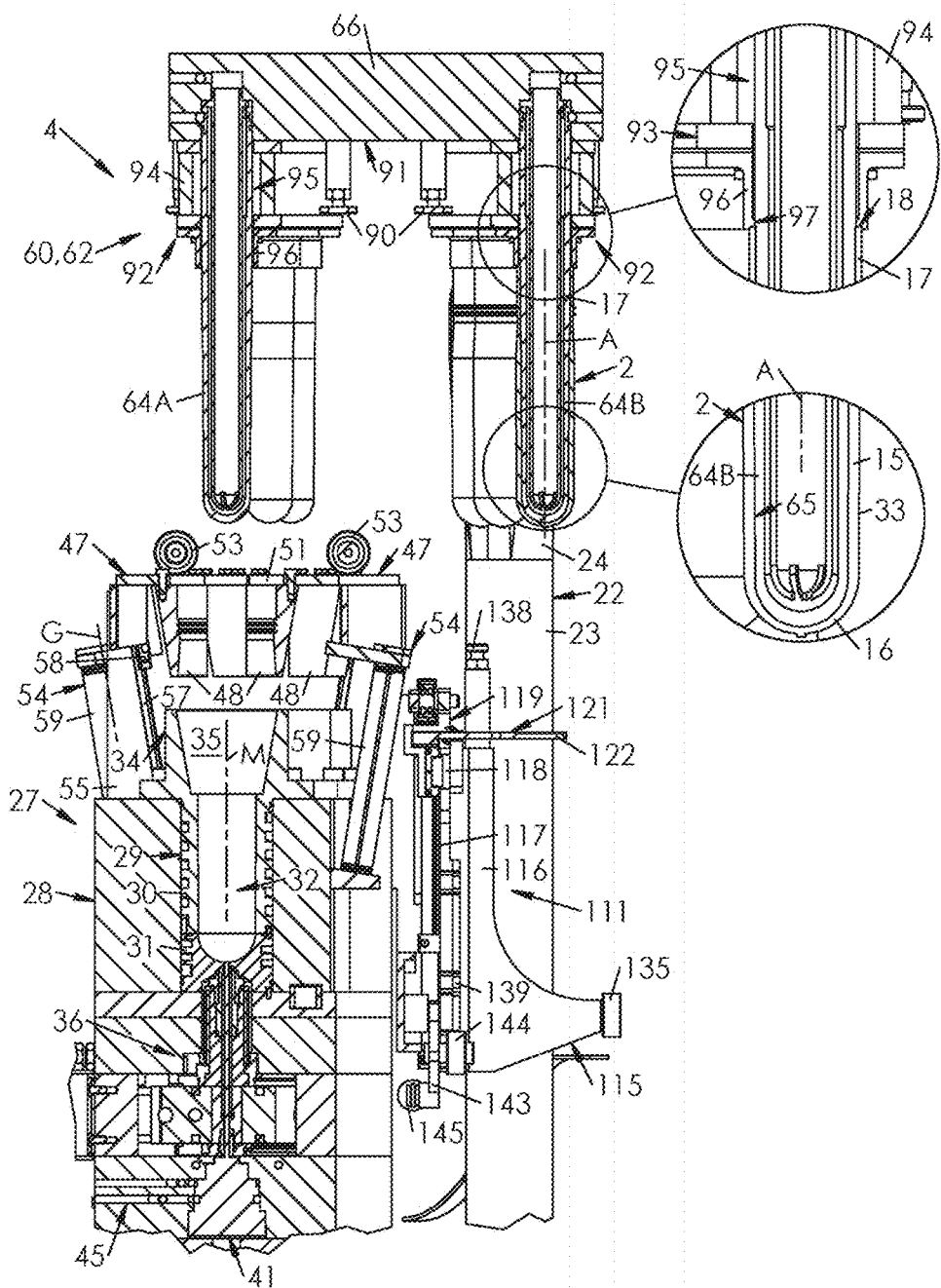
FIG. 8 is a transversal cutaway view of the molding unit of FIG. 2.

As FIG. 8 clearly shows, the lateral wall 30 is extended, opposite the mold bottom 31, by an upper projecting cross-section 34 that defines a tapered reserve 35 in the axial extension of the cavity.

According to a preferred embodiment, the mold holder block 28 integrates multiple mold bodies 29, in this case six in number. The mold bodies 29 are placed side by side, preferably along a curved line, such as an arc whose radius corresponds to the radius of the carrousel 3.

Figure 20:
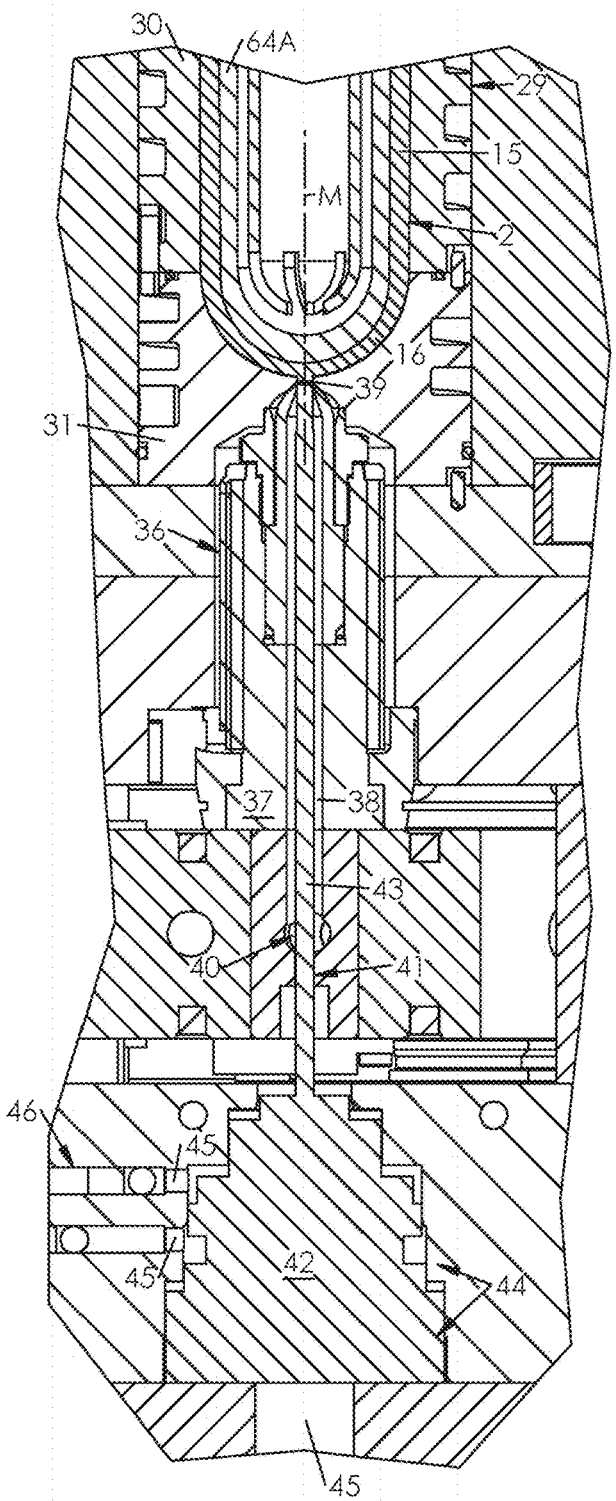

The mold holder block 28 further integrates a system 36 for injection of the material in each mold body 29. This injection system 36 (readily visible in FIGS. 12 and 20) comprises, for each mold body 29, a stationary body 37, defining an injection channel 38 emptying into the cavity 32 through a hole 39 pierced in the mold bottom 31. The injection channel 38 is connected to the dosimetric injection device 14 by a distribution circuit 40 integrated with the mold holder block 28. The injection system 36 also comprises an injector 41 including a piston 42 that is mounted in axial translation in relation to the body 37, and a needle 43 that is integral with the piston 42 and that extends axially from an upper face of the latter, through the injection channel 38 and to the mold bottom 31.

The piston 42 is mounted in axial translation in relation to the body 37, in a chamber 44 defined by the latter, between a blocking position (illustrated in FIG. 12) in which a free end of the needle 43 blocks the hole 39 and thus blocks the injection of the material into the cavity 32, and an injection position (FIG. 20) in which the free end of the needle 43 is separated from the hole 39 downward, which brings the injection channel 38 into communication with the cavity 32.

For this purpose, the molding unit 4 comprises a circuit 45 for controlling the movement of the injector. This control circuit 45 is, for example, pneumatic (or hydraulic) and comprises pipes 46 for feeding the chamber 44 with fluid to alternately move the piston 42 from its blocking position toward its injection position, and vice versa, in the manner of a pneumatic (or hydraulic) jack.

The mold holder 27 further comprises a pair of drawers 47 each carrying at least one neck half-ring 48 having an inner face 49 bearing the imprint of the neck 17 of a preform 2 and an outer tapered face 50. Each drawer 47 carries a number of half-rings 48 equal to the number of mold bodies 29 (six, in the illustrated example). As FIG. 3 shows, each drawer 47 comprises a plate 51 equipped, on an inner edge, with semi-circular scallops 52 at right angles to each of which is attached (for example by screwing) a neck half-ring 48.

Figure 3:
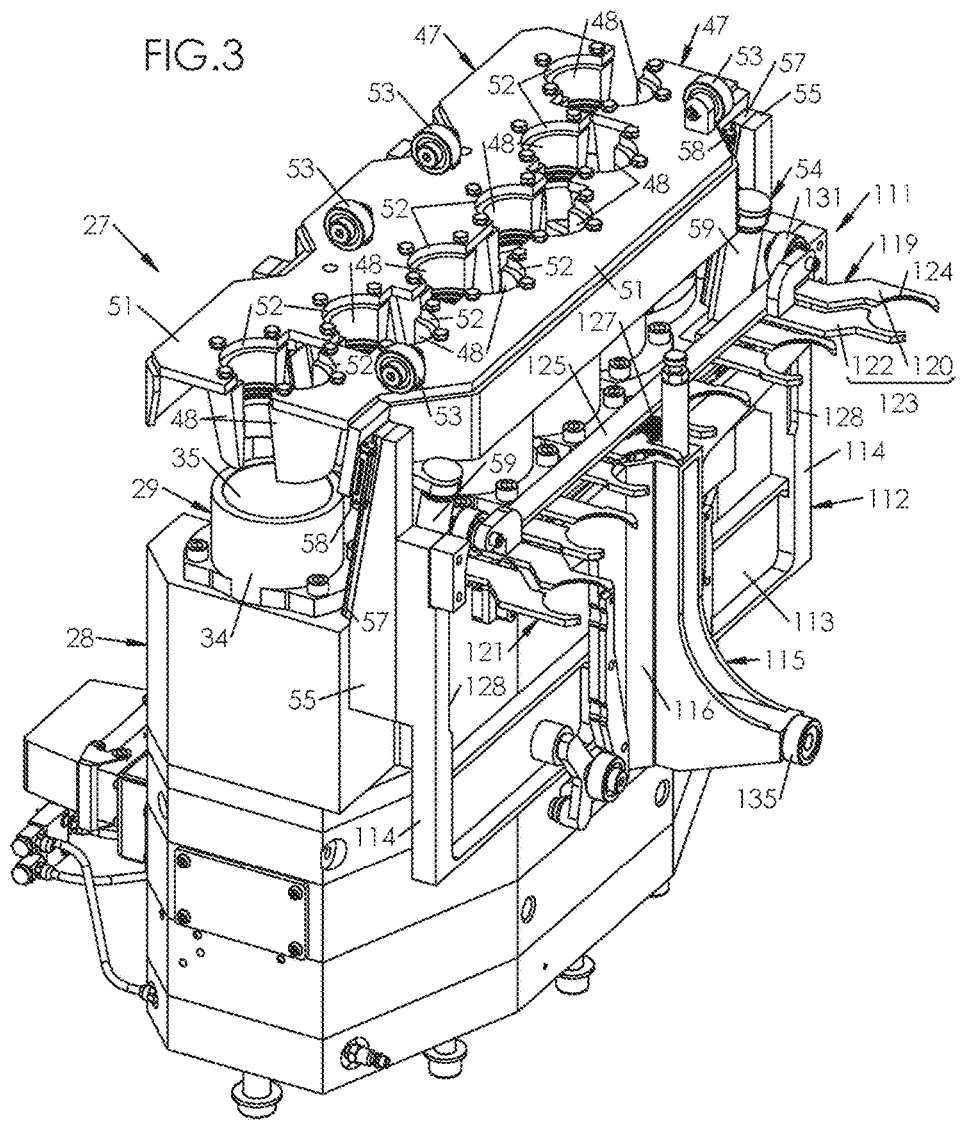
FIG. 3 is a perspective view showing the mold holders of the unit of FIG. 2.

Each half-ring 48 is mounted perpendicular to a mold body 29, and the half-rings 48 are positioned side by side along the same profile as the mold bodies 29 (in this case, an arc, as FIG. 3 clearly shows). The drawers 47 are mounted opposite one another in such a way that their plates 51 are co-planar and their scallops 52 face one another. Each plate 51 carries at least one roller 53 (in this case, a pair of rollers 53) whose function will appear below.

Each drawer 47 is mounted to move in relation to the mold holder block 28 between a demolding position (FIGS. 3, 8, 9) in which the (or each) half-ring 48 is separated, both axially upward and laterally, from the tapered reserve 35 of the corresponding mold body 29, and a molding position (FIGS. 15, 16, 19) in which the (or each) half-ring 48 is housed in this tapered reserve 35.

Figure 9:
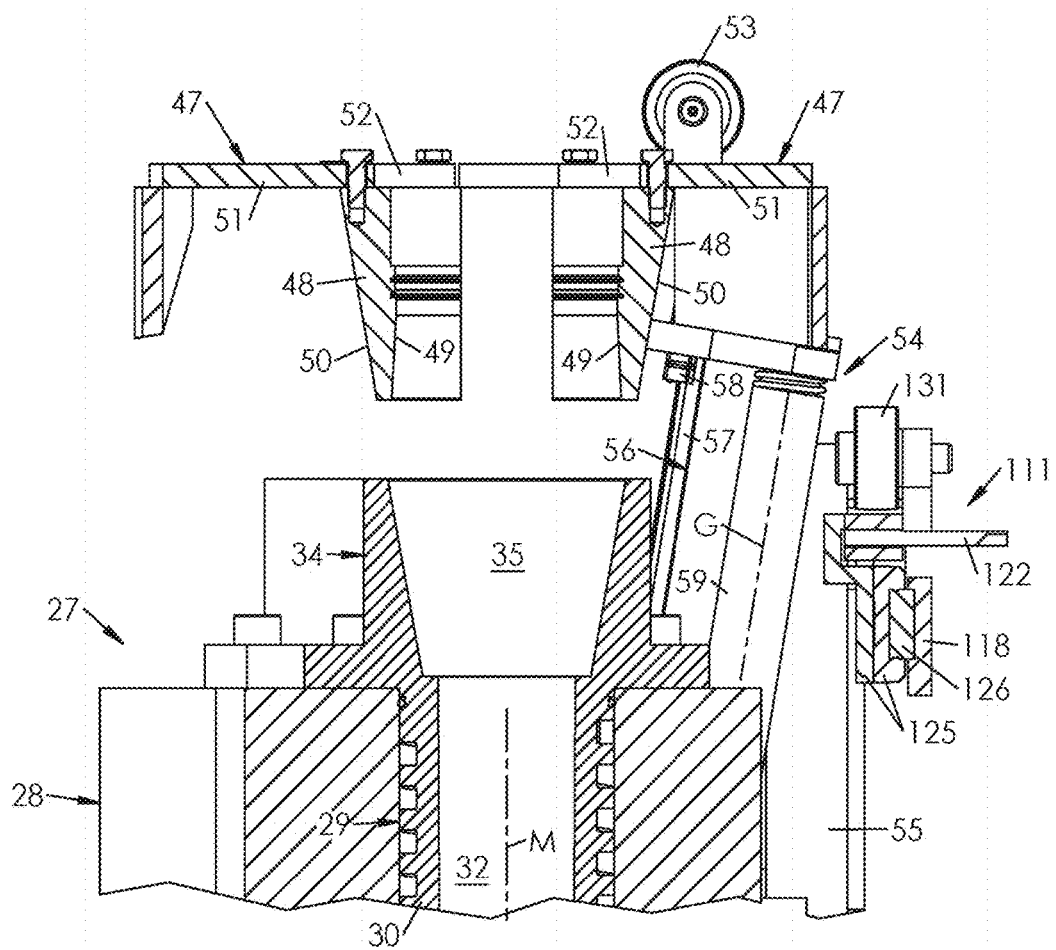
FIG. 9 is a detail cutaway view of the mold holder of FIG. 3.

As FIGS. 3 and 9 show, the mold holder 27 comprises a system 54 for guiding each drawer 47 in a guiding direction G that is inclined in relation to the vertical (i.e., in relation to the molding axis M). This system 54 comprises, for each drawer 47, a pair of posts 55 that are integral with the mold holder block 28, with each post 55 having an inclined inner face 56 (of several degrees) in relation to the vertical, on which is formed or attached a casing 57 defining the guiding direction G and on which is mounted in translation a trolley 58 that is integral with the drawer 47. Return springs 59 (for example operating by compression) are inserted between the mold holder block 28 and each drawer 47, in the guiding direction G (i.e., parallel to the slides 57), to push the drawer 47 toward its demolding position.

In the third place, the molding unit 4 comprises a movable apparatus 60 that includes a carriage 61 mounted in a movable way in relation to the frame 19, and a core holder 62 mounted on the carriage 61 by being movable in rotation in relation to the latter.

The carriage 61 comprises a central shaft 63 to which is hooked the core holder 62 and that defines an axis R of rotation of the latter (FIG. 10). Below, it is said of a component that it is located toward the inside of the molding unit 4 when it is between the central shaft 63 and the bracket 21; conversely, it is said of a component that it is located toward the outside (or toward the periphery) of the molding unit 4 when it is on the other side of the central shaft 63, in relation to the bracket 21. Taking these definitions into account, it is seen that the mold bodies 29 are located toward the inside of the molding unit 4.

The core holder 62 carries at least one pair of cores, namely an oblong primary core 64A and an oblong secondary core 64B that are separated from one another, each bearing the imprint of an inner face 65 of the body 15 of a preform 2.

According to an embodiment that is illustrated in the figures, the core holder 62 carries two rows of cores, each comprising a number of cores equal to the number of mold bodies 29, namely a row of primary cores 64A and a row of secondary cores 64B. The cores 64A, 64B of each row extend side by side along the same profile and the same separation as the mold bodies 29 in which they are intended to be housed.

Thus, as can be seen in particular in FIGS. 2, 7, 13, 14, 17, 25 and 27, the cores 64A, 64B of each row extend side by side along a curved, preferably circular, profile.

The primary cores 64A and the secondary cores 64B are identical, and the object of their arbitrary designation is only to facilitate the understanding of this description. The uncovered primary cores 64A are readily visible in FIGS. 2, 7 and 8; the uncovered secondary cores 64B are readily visible in FIG. 25.

Figure 7:
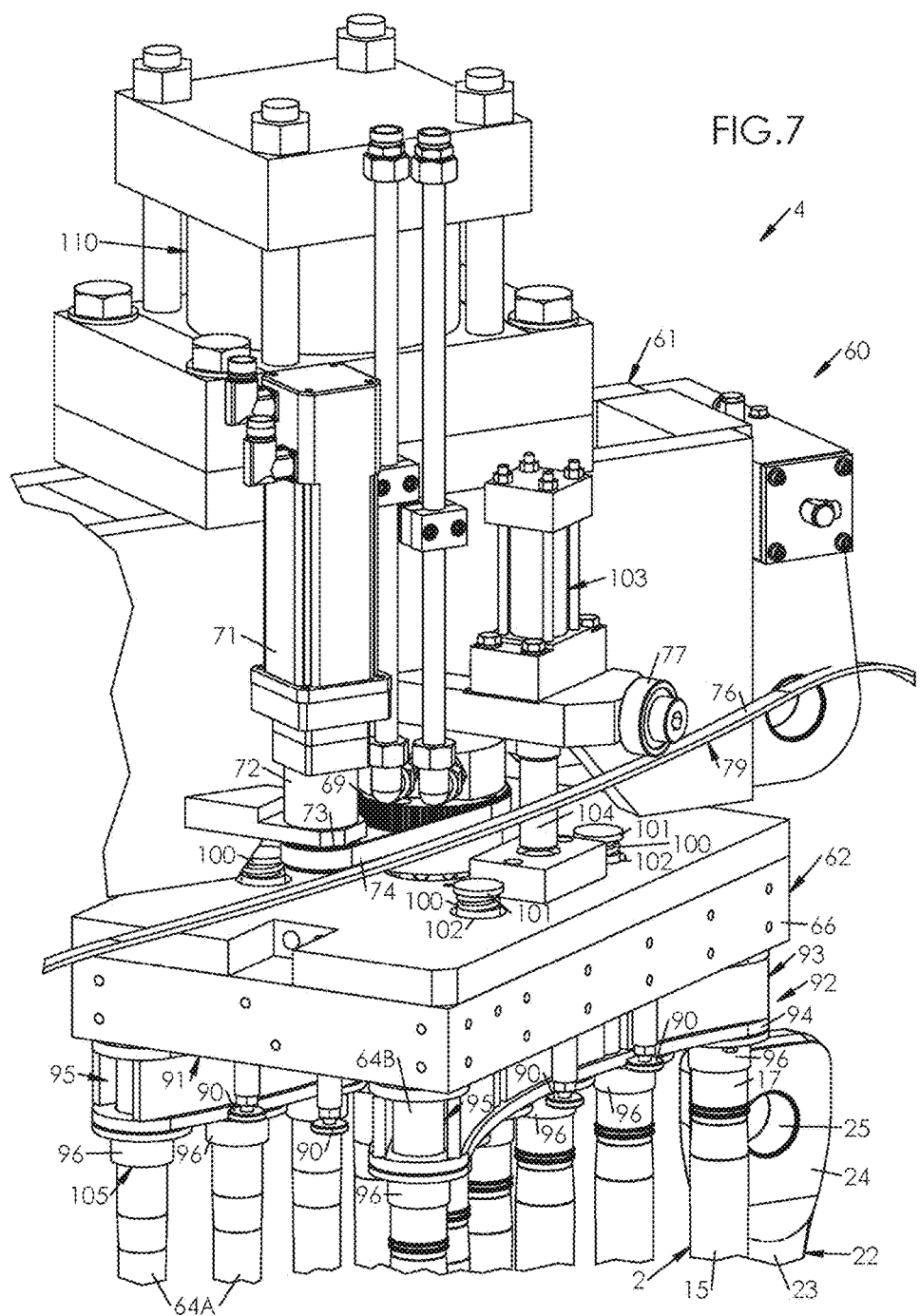
FIG. 7 is a detail perspective view of the molding unit of FIG. 2.

As FIGS. 7 and 10 show, the core holder 62 comprises a plate 66 under which the cores 64A, 64B are mounted.

The plate 66 comprises a case 67 in which the central shaft 63 of the carriage 61 is shrunk-on. The rotation of the core holder 62 in relation to the carriage 61 is carried out by means of a bearing 68 (for example a ball bearing or a conical roller bearing) inserted between the central shaft 63 and the case 67. The case 67 carries, at its upper end, at the level of the bearing 68, a ring gear 69 by which the core holder 62 is driven in rotation. The suspension of the plate 66 with the carriage 61 is made by means of a circlip 70 mounted on the central shaft 63 and forming a stop for the bearing 68.

Furthermore, the carriage 61 carries a motor 71 (preferably a brushless motor, since this type of motor offers precise angular control) having an output shaft 72 equipped with a pinion 73 coupled to the ring gear 69 by means of a belt 74. The rotation of the output shaft 72 of the motor 71 consequently drives (via the pinion 73, the belt 74 and the ring gear 69) the rotation of the core holder 62 around the central shaft 63, between:

A so-called primary alignment position (FIGS. 2, 8, 13, 14, 16, 17, 18) in which each primary core 64A extends, toward the inside of the molding unit 4, in the alignment of a mold body 29 while each secondary core 64B is offset in relation to the mold body 29 toward the outside, and A so-called secondary alignment position (FIG. 27) in which the primary core(s) 64A and secondary core(s) 64B are transposed.

The carriage 61 is itself mounted in translation in relation to the frame 19, by means of casings 75 working with the guide rails 26, between:

A molding position in which each core (primary 64A in the primary alignment position of the core holder 62, secondary 64B in the secondary alignment position of the core holder 62) is housed in a mold body 29, and A demolding position, offset axially (upward) in relation to the molding position, and in which the core 64A (or 64B) is separated axially from the mold body 29.

As illustrated in FIG. 2, the translational movement of the carriage 61 is controlled by an upper cam groove 76 with which a cam follower 77 works (in this case, in the form of a roller) mounted in rotation on the carriage 61. The upper cam groove 76 extends on the periphery of the carrousel 3, over at least one angular portion of the passage of the molding unit 4. This upper cam groove 76 comprises low portions 78, which, when the cam follower 77 is located there, make it possible for the carriage 61 to adopt its molding position under the action of its own weight, and at least one raised portion 79, which, when the cam follower 77 is located there, raises the carriage 61 to place it in its demolding position.

As illustrated in FIG. 2, and more particularly in the detail insert, the carriage 61 is equipped with a locking device 80 in the molding position. This device 80 comprises locks 81, in a number equal to the columns 22, each equipped with:

A screed 82 defining a housing 83 for the head 24 of the column 22, each screed 82 being pierced by a through hole 84, and A bolt 85 mounted to slide horizontally in the hole 84 of the screed 82 between an unlocking position (FIG. 2) in which the bolt 85 is separated from the housing, and a locking position in which the bolt 85 extends through the housing 83.

To ensure the translational movement of the bolt 85, each lock 81 comprises an actuator 86, for example in the form of a jack (pneumatic, hydraulic, or else electric) equipped with a rod that is integral with the bolt 85. According to a particular embodiment illustrated in FIG. 2, the jack 86 comprises a body 87 mounted on the screed 82, and the rod of this jack 86 is made integral with the bolt 85 by means of a vertical stick 88 that can slide in a groove 89 made in the body 87 of the jack 86.

As FIG. 19 clearly shows, the core holder 62 carries, for each roller 53 of the drawer 47, a support element 90 (in this case, in pad form) projecting from a lower face 91 of the plate 66. During the movement of the core holder 62 toward the molding position, each support element 90 pushes, by application against a roller 53, the drawer 47 back toward its molding position, in opposition to the return spring 59 (whose central part is shown in the form of a cylinder in FIG. 19, for the sake of simplicity).

Figure 16:
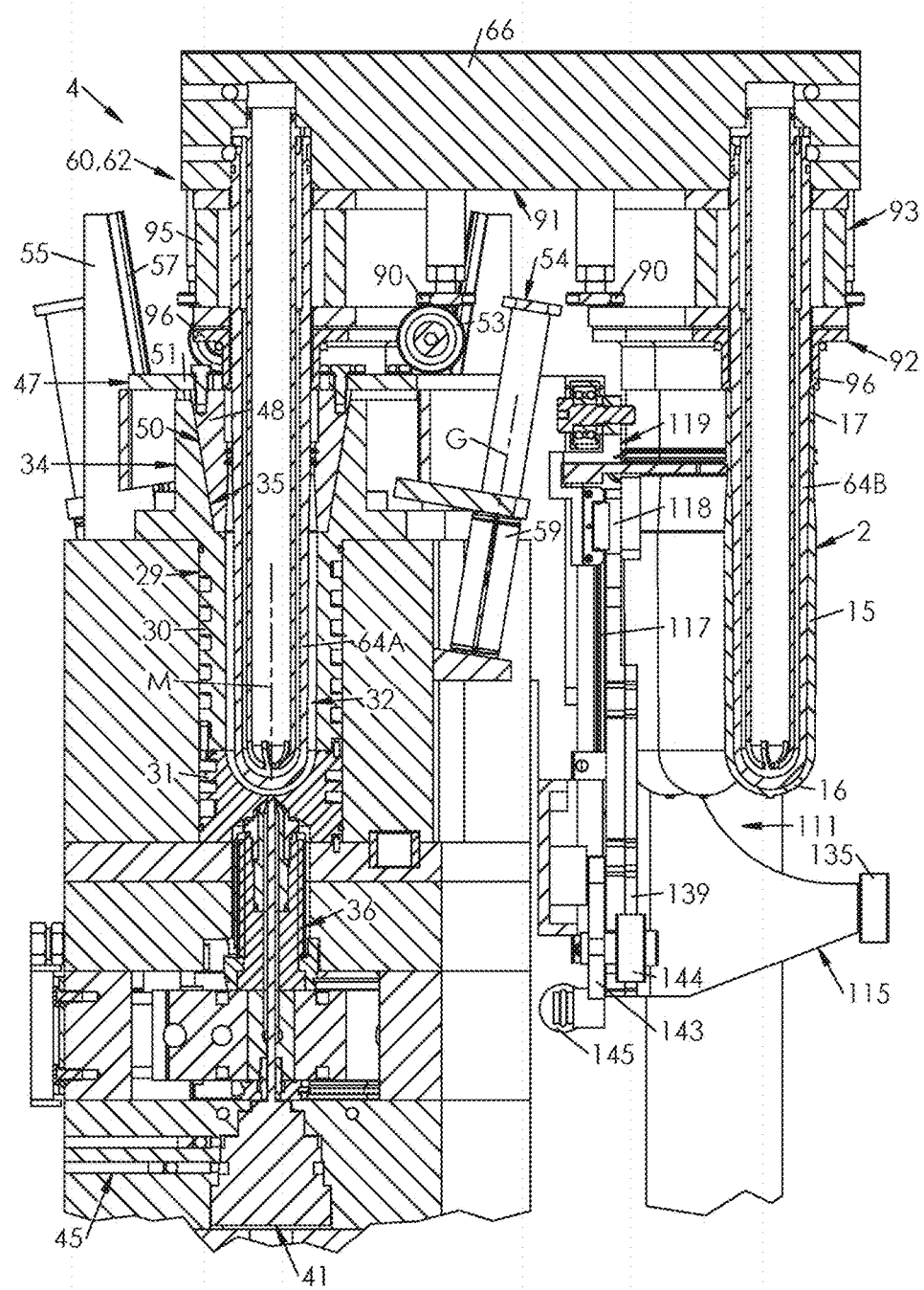
FIG. 16 is a transversal cutaway view similar to FIG. 8, showing the molding unit in the molding position of FIG. 14.

In descending toward the molding position, the carriage 61 drives, in its downward movement, the core holder 62 (in the primary alignment position in FIG. 19), whose plate 66 in its turn entrains, via the support elements 90 in rolling contact with the rollers 53 (as illustrated in particular in FIG. 13), the drawers 47 that each carry out an oblique translational movement to their molding position. At the end of travel, i.e., in the molding position, the primary cores 64A are each received in a mold body 29, and the half-rings 48 are assembled around the core 64A by being housed in the tapered reserve 35 for forming in pairs a ring bearing the imprint of the neck 17 of the preform 2 to be formed (FIGS. 15, 16, 19). As long as the movable apparatus 60 has not reached its molding position, the locks 81 remain in their unlocking position (FIG. 2). By contrast, since the movable apparatus 60 has reached its molding position, the heads 24 of the columns 22 being housed in the screeds 82, the bolts 85 of the locks 81 are placed in the locking position (FIG. 14) by controlling their respective jacks 86. The bolts 85 then jointly pass through the holes 25, 84 and ensure the rigid engagement of the carriage 61 with the frame 19 by means of the columns 22.

In the fourth place, the molding unit 4 comprises a device 92 for uncovering molded preforms 2 from their respective cores 64A, 64B. This uncovering device 92 is mounted on the movable apparatus 60 and comprises, for each row of cores 64A, 64B, an extractor 93 that includes a cage 94 equipped with a row of cavities 95, through each of which a core 64A, 64B extends. In the extension of each cavity 95, the cage 94 comprises a pusher 96 equipped with a cylindrical central bore 97 in which the core 64A, 64B is mounted in axial translation. Each extractor 93 also comprises a pin 98 that is integral with the cage 94, which extends axially into a through opening 99 formed in the plate 66 (FIG. 10).

Each extractor 93 is mounted in axial translation, in relation to the plate 66, between a top position, so-called rest position, in which the extractor 93 abuts against the lower face 91 of the plate 66, and a bottom position, so-called extraction position, in which the extractor 93 is separated from the lower face 91 of the plate 66.

The uncovering device 92 comprises, for each extractor 93, a return spring 100 that drives the extractor 93 toward its rest position. More specifically, the extractor 93 comprises (FIG. 7) a pair of guide rods 101, each mounted in translation in a bore 102 formed in the plate 66, and a return spring 100 is mounted on each guide rod 101 by being compressed between an enlarged head of the rod 101 and a counterbore formed in the plate 66 around this bore 102.

To move each extractor 93 toward its extraction position, the molding unit 4 comprises an actuator 103 mounted on the carriage 61, which comprises a peg 104 mounted in translation in relation to the carriage 61 between a top position (FIG. 10) in which the peg 104 is separated axially from the pin 98 and thus makes it possible for the extractor 93, under the action of the return spring(s) 100, to occupy its rest position, and a bottom position (FIG. 21) in which the peg 104 exerts on the pin 98 an axial push downward, which moves the extractor 93 toward its extraction position to disengage the molded preform 2 from its core 64A, 64B, as will be specified below. According to an embodiment illustrated in the figures, the actuator 103 comes in the form of a pneumatic (or hydraulic or else electric) jack whose rod forms the peg 104. The actuator 103 is attached to the carriage 61 at right angles to the opening 99 located toward the outside of the molding unit 4.

In addition to the function of uncovering the molded preform 2 from its core 64A, 64B after transposition of the latter, each pusher 96 also performs a function of closing the cavity 32 into the molding position, as illustrated in FIG. 19. More specifically, the pusher 96 has, at its lower end, an annular face 105 bearing the imprint of the lip 18, with this annular face 105 being applied against the paired neck half-rings 48 that are in the molding position.

In the molding position, the mold body 29, the core 64A, 64B housed in the mold body 29, the half-rings 48 assembled around the core 64A, 64B, and the pusher 96 abutting against the assembled half-rings 48 together form a complete mold 106 bearing the imprint of a preform 2.

The plastic material injected into the cavity 32 via the injector 41 exerts on the preform 2 and on the pusher 96 (and therefore on the core holder 62) a push directed upward, along the molding axis M. With the molding axis M being offset from the axis R of rotation of the core holder 62 toward the inside of the molding unit 4, and the plate 66 extending in cantilever position in relation to the central shaft 63, this force tends to make the core holder 62 tilt around a horizontal axis.

So as to balance the forces on the core holder 62, the molding unit 4 comprises, in the fifth place, a shoring-up device 107 mounted on the carriage 61 and including a stop 108 positioned toward the inside of the molding unit 4, perpendicular to the mold body 29.

This stop 108 is mounted in translation in relation to the carriage 61 between a top (or inactive) position in which the stop 108 is separated from the core holder 62, and a bottom (or active) position in which the stop 108 is applied against the core holder 62 for compensating the axial forces resulting from the pressure of the material injected into the mold 106 for forming the preform 2.

Figure 21:
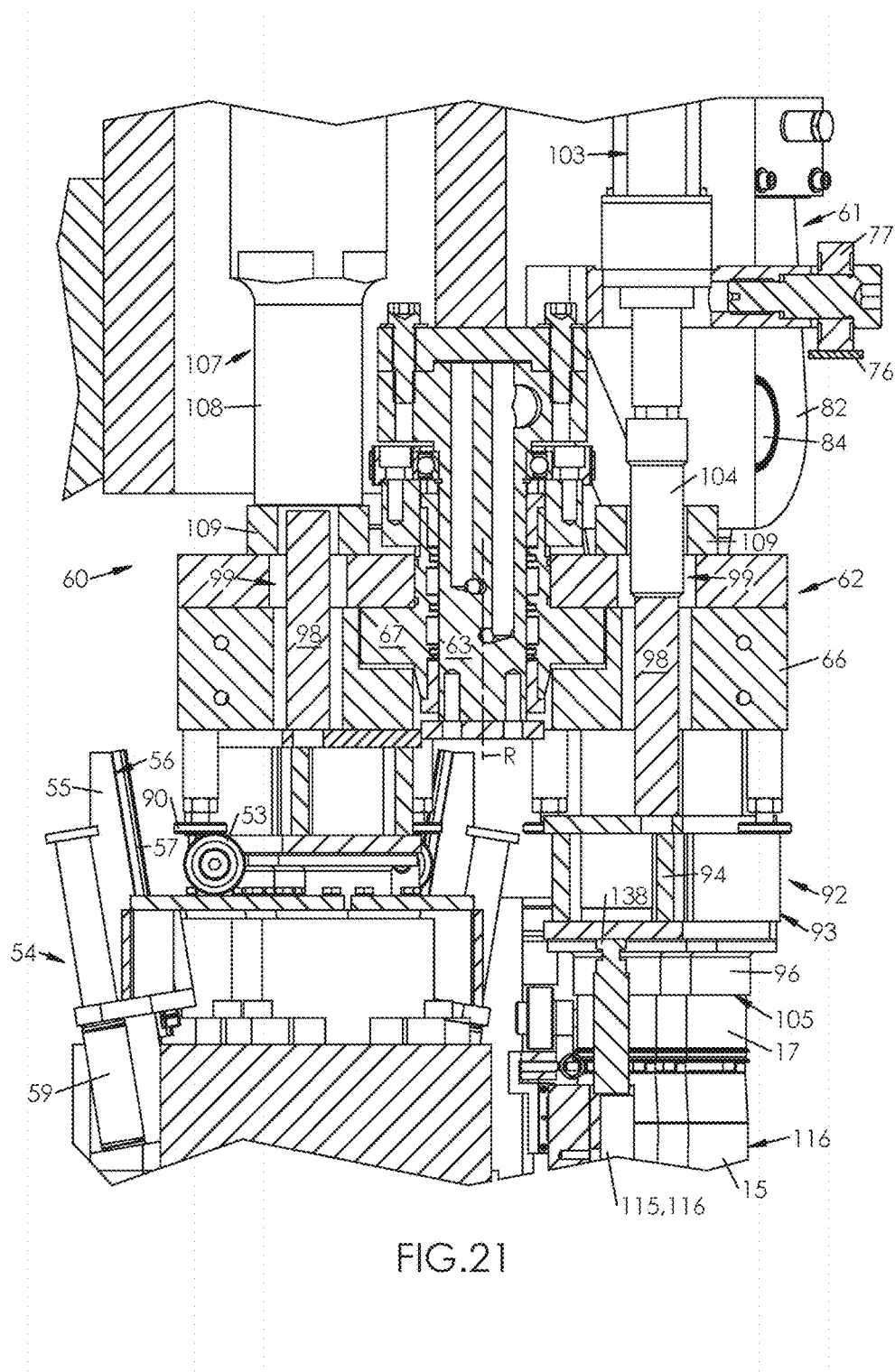
FIG. 21 is a detail cutaway view that is similar to FIG. 10, illustrating both, on the left, the shoring-up device working with the mold holder, and, on the right, the system for uncovering molded preforms.

According to an embodiment illustrated in the figures, and in particular in FIG. 21, the stop 108 extends axially at right angles to the pin 98 located toward the inside of the molding unit 4. As FIG. 10 clearly shows, the plate 66 carries, in the extension of the opening 99, a crosspiece 109 in which is housed an upper end of the pin 98, in the rest position of the extractor 93 located toward the inside of the molding unit 4. In its active position, the stop 108 is applied against the crosspiece 109 that thus protects the pin 98 from any contact with the stop 108.

According to an embodiment, the stop 108 is formed by a rod of a pneumatic (or hydraulic, or else electric) jack 110 that is attached (FIG. 7) to the carriage 61 at right angles to the opening 99 located toward the inside of the molding unit 4.

In the sixth place, the molding unit 4 comprises a device 111 for gripping molded preforms 2 uncovered from their cores 64A, 64B.

This gripping device 111, seen by itself in FIG. 3, is mounted on an outer face of the mold holder 27. More specifically, the gripping device 111 is integral with the mold holder block 28 and comprises a frame 112 attached to the latter. This frame 112 has a U-shaped profile; it comprises a horizontal base 113 and two vertical arms 114 that each extend upward from one end of the base 113 and are attached to the posts 55 toward the outside, opposite the inner face 56 (i.e., opposite the slides 57).

The gripping device 111 comprises a support 115 mounted to slide vertically on the mold holder block 28. More specifically, the support 115 has a T-shape and comprises a strut 116 that extends vertically and through which the support 115 is mounted to slide on the mold holder block 28 by means of a casing 117, and a crosspiece 118 that extends horizontally on both sides of the strut 116.

The gripping device 111 also comprises a pair of combs, namely:

A right comb 119 that comprises at least one right jaw 120, and

A left comb 121 that comprises at least one left jaw 122 placed opposite the right jaw and that defines with the latter a clamp 123 for gripping a preform.

In practice, each comb 119, 121 comprises a row of jaws 120, 122 (six in number in the illustrated example) that define two by two a series of gripping clamps 123. These clamps 123 are placed side by side perpendicular to the cores 64A or 64B located on the outer side of the molding unit 4 and are arranged according to an identical profile (in this case curved, and more specifically in an arc).

The combs 119, 121 are mounted to move in relation to one another between a release position (FIG. 3) in which the jaws 120, 122 of each clamp 123 are separated, and a gripping position (FIGS. 15, 22, 23, 26) in which the jaws 120, 122 are drawn toward one another. As FIG. 3 clearly shows, each jaw 120, 122 has an inner edge 124 in an arc, in such a way that in the gripping position, each clamp 123 surrounds the body 15 of a preform 2 close to its outer face 33.

In the illustrated example, each comb 119, 121 has a horizontal bar 125, by which the comb 119, 121 is mounted in translation on the crosspiece 118 of the support 115 by means of a casing 126, and from which the jaws 120, 122 project toward the outside.

The gripping device 111 comprises a return spring 127 that stresses the combs 119, 121 toward their gripping position. In the illustrated example, the spring 127 operates by compression; it is inserted between the most central jaws 120, 122 of the combs 119, 121, placed back-to-back.

Figure 4:
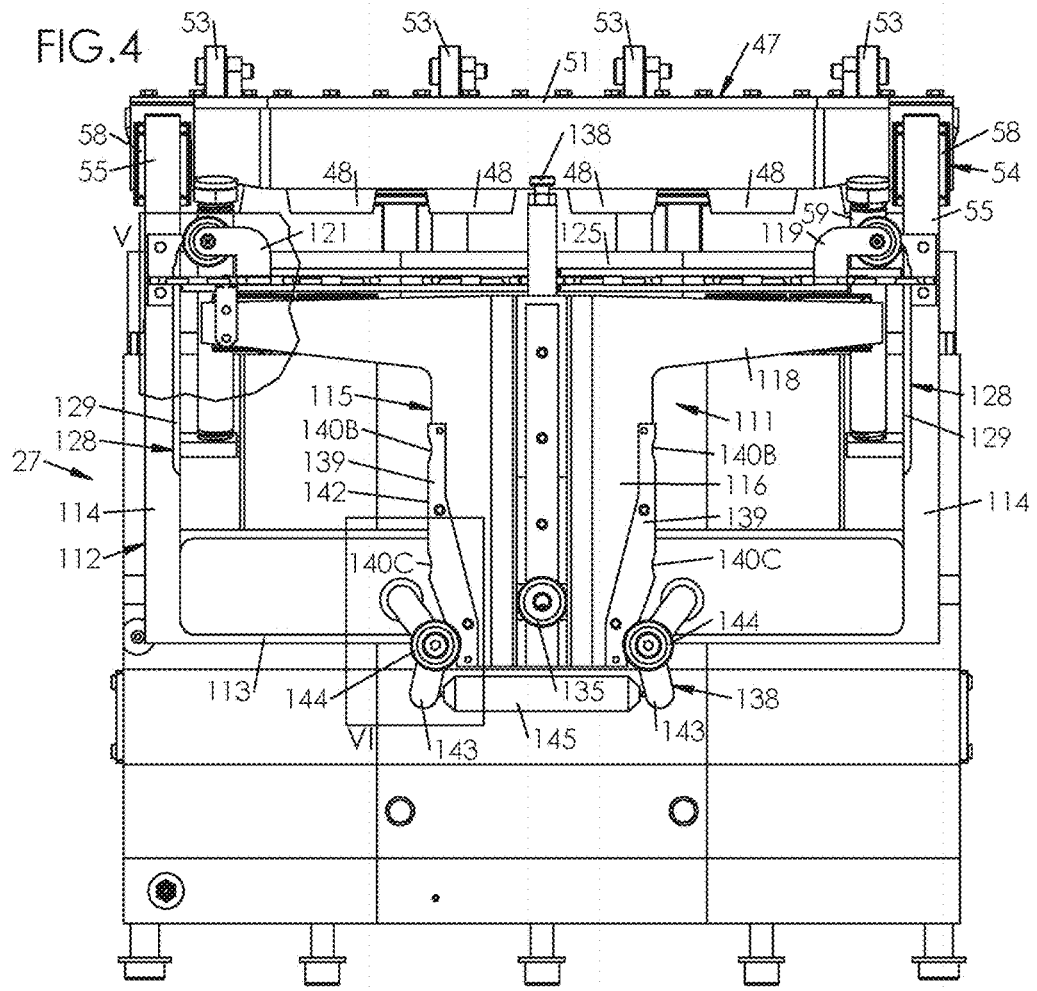
FIG. 4 is a side view of the mold holder of FIG. 3.
Figure 5:
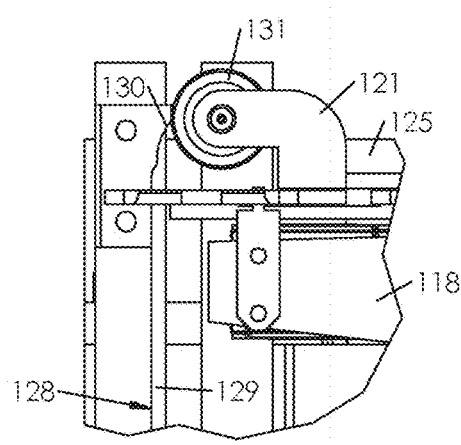
FIG. 5 is a detail view of FIG. 4, according to the insert V.
Figure 6:
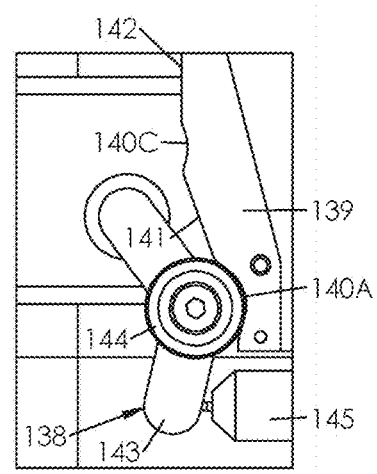
FIG. 6 is a detail view of FIG. 4, according to the insert VI.
Figure 22:
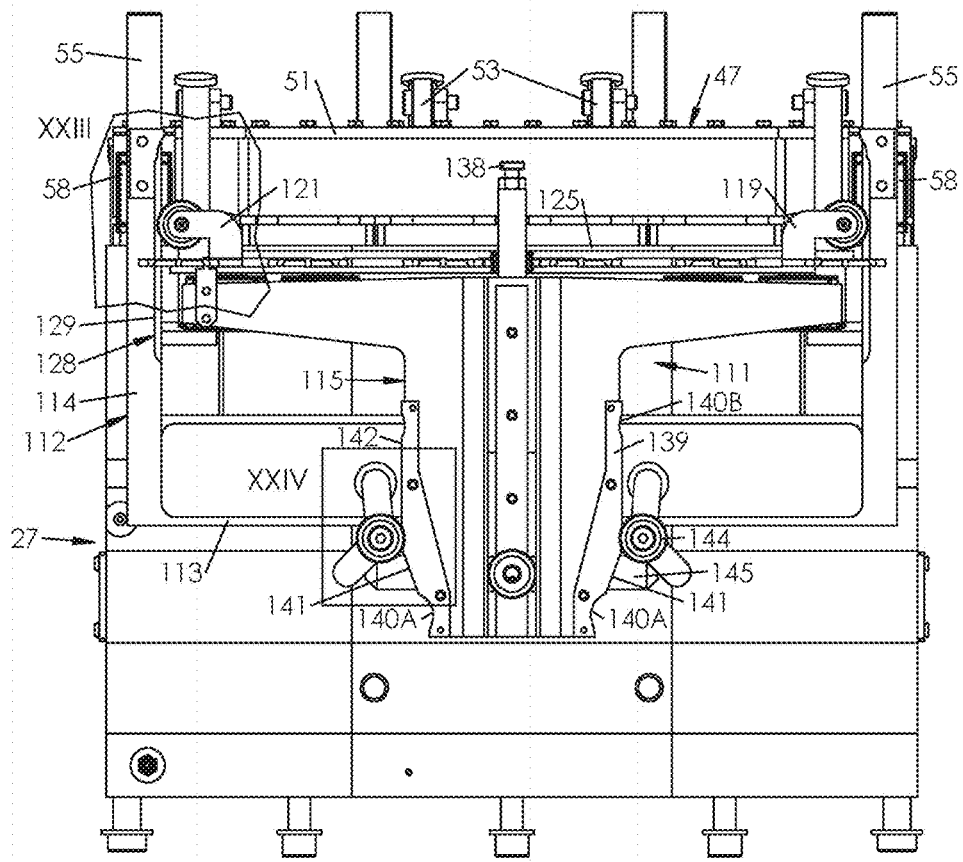
FIG. 22 is a side view that is similar to FIG. 4, showing the mold holder of the molding unit in the position of FIG. 17.
Figure 23:
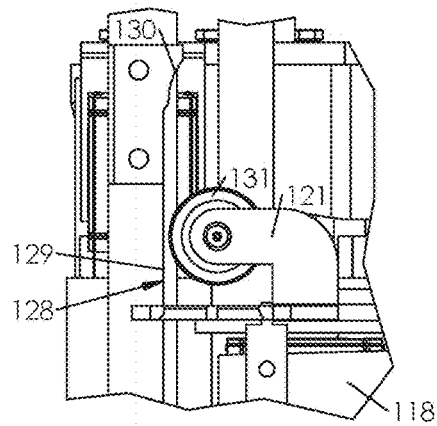
FIG. 23 is a detail view of the mold holder of FIG. 22, according to the insert XXIII.

As FIGS. 3 and 4 clearly show, and in more detail still in FIG. 5, the frame 112 carries a pair of lateral cam grooves 128 each having a straight (vertical) main cross-section 129 and, starting from an upper end of the main cross-section 129, a narrow cross-section 130. Each comb 119, 121 carries a cam follower 131 (in this case, in the form of a roller) that works with a lateral cam groove 128. When the cam followers 131 are jointly in the main cross-sections 129 of the lateral cam grooves 128, the combs 119, 121 are, under the action of the return spring 127, in their gripping position (FIGS. 22, 23). When the cam followers 131 are jointly in the narrow cross-sections 130, the combs 119, 121 are placed in their release position in opposition to the return spring 127 (FIGS. 3, 4, 5).

In a top position of the support 115, illustrated in FIGS. 3 and 4, the latter places the combs 119, 121, via the narrow cross-sections 130 of the lateral cam grooves 128 and the cam followers 131, in their release position. In contrast, in a bottom position of the support 115, illustrated in FIG. 26, the latter makes it possible (under the action of the return spring 127) for combs 119, 121 to adopt their gripping position.

As illustrated in FIG. 3, the translational movement of the support 115 is controlled by a lower cam groove 132 that has two superposed fragments 133, 134 locally. A cam follower 135 (in this case in the form of a roller), mounted in rotation on the support 115, works with this cam groove 132. The lower cam groove 132 extends at the periphery of the carrousel 3, over at least one angular portion of the passage of the molding unit 1. This groove 132 comprises a top portion 136, and receives the cam follower 135 from the top position (or an intermediate position) of the support 115 to move the latter toward its bottom position, and a bottom portion 137 in which the cam follower 135 places the support 115 in its bottom position.

The gripping device 111 comprises a pad 138 that is integral with the support 115 and able to come into contact with the extractor 93.

In addition, according to a preferred embodiment illustrated in the figures and more specifically in FIGS. 4, 6, 22 and 24, the device 111 comprises:

On the strut 116, a pair of guides 139 each equipped with a lower slot 140A, an upper slot 140B, and optionally an intermediate slot 140C, with each guide having an oblique lower cross-section 141, a straight upper cross-section 142, and On the frame 112, a pair of levers 143 mounted in rotation on the base 113 and each carrying a roller 144 that can roll on a guide 139 and can fit together in a reversible manner in the slots 140A, 140B, 140C.

The slots 140A, 140B, 140C each have an arc-shaped profile, complementary to a roller 144. The levers 143 are driven toward one another by means of a return spring 145, operating in this case in traction. Under the action of the spring 145, the rollers 144 are in permanent contact with the guides 139. The force applied by the spring 145 to the levers 143 is sufficient, when the rollers 144 are housed in a pair of slots 140A, 140B or 140C, to keep the support 115 in position in the absence of a lower cam groove 132. In its downward movement, the extractor 93 rests on the pad 138 by which it stresses the support 115 in the downward direction. The rollers 144, driven toward one another by the spring 145, are in contact with the oblique cross-sections 141 of the guides 139 and apply to the support 115 a force whose vertical component is opposite to the free fall of the support 115 without, however, preventing the downward movement of the latter under the action of the extractor 93.

The dosimetric injection device 14 is now described with reference to FIGS. 28 to 34. This device 14 is designed to deliver to each molding unit 4, with which it has a fluid connection via the feed pipe 13, a predetermined dose of plastic material corresponding to the volume of material required for the molding of a preform.

Figure 28:
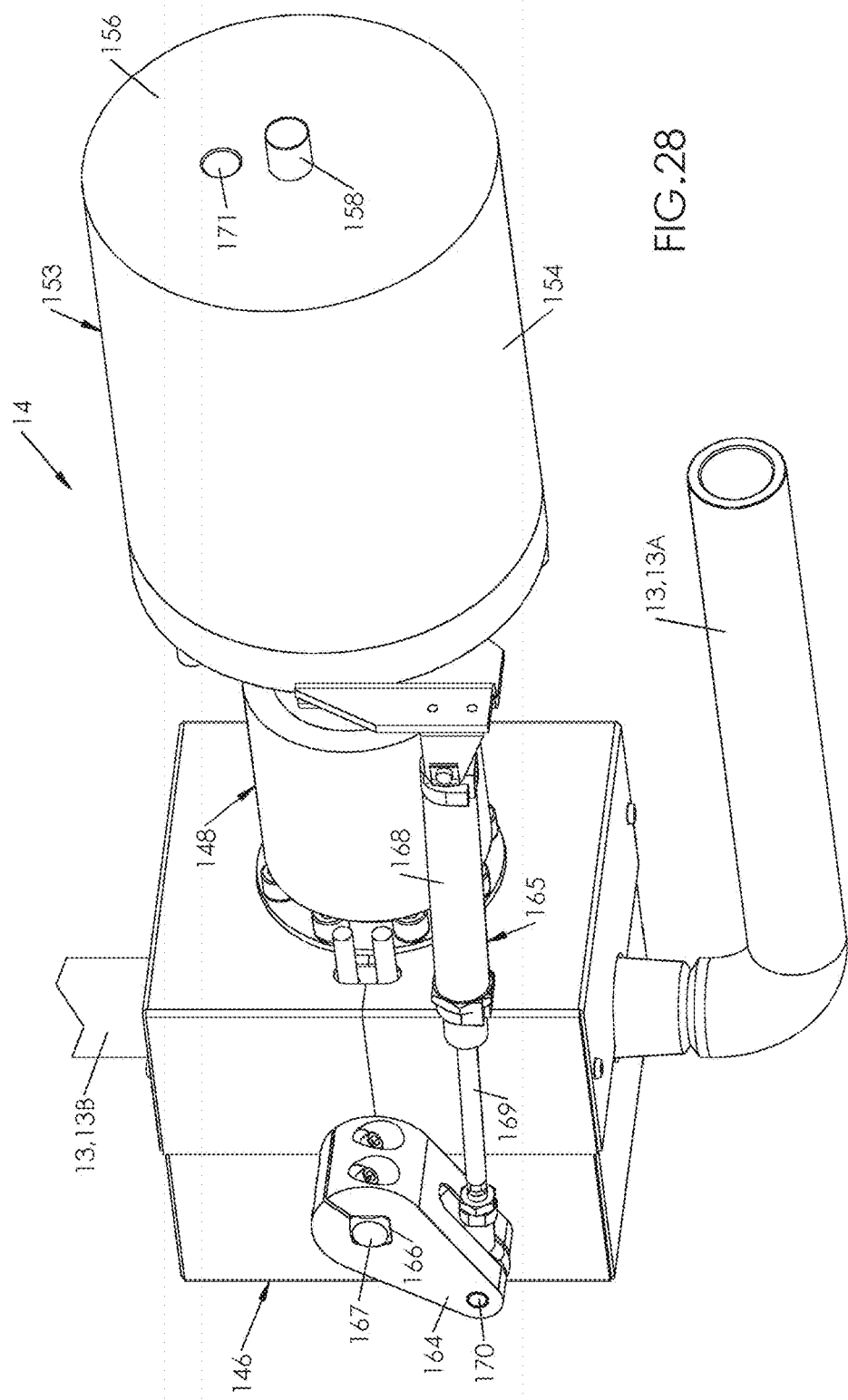
FIG. 28 is a perspective view, underneath, of the dosimetric injection device shown in the detail inset on the right in FIG. 1, in a position prior to the sampling of a dose of material coming from the extruder.
Figure 29:
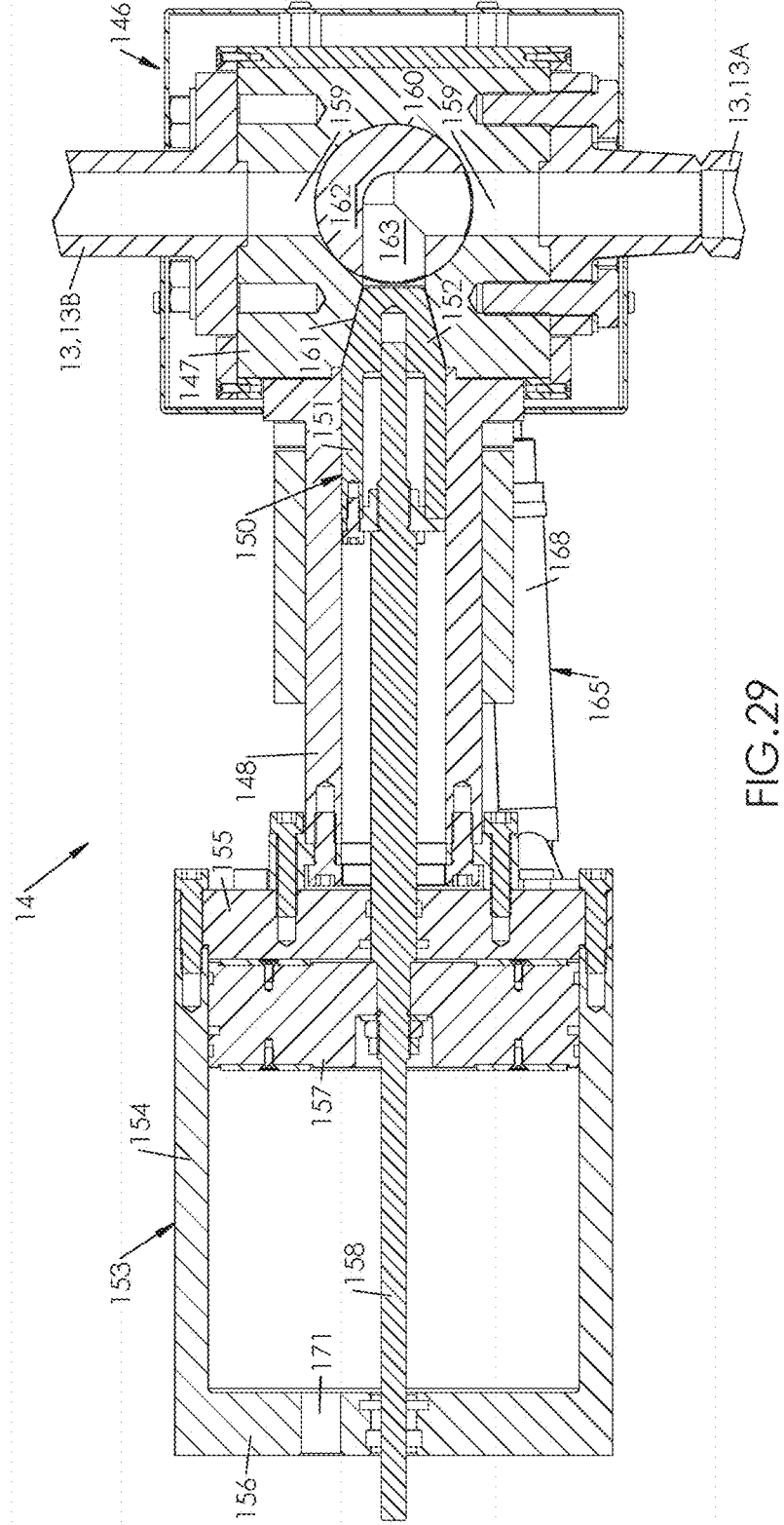
FIG. 29 is a cutaway view of the dosimetric injection device of FIG. 28.
Figure 30:
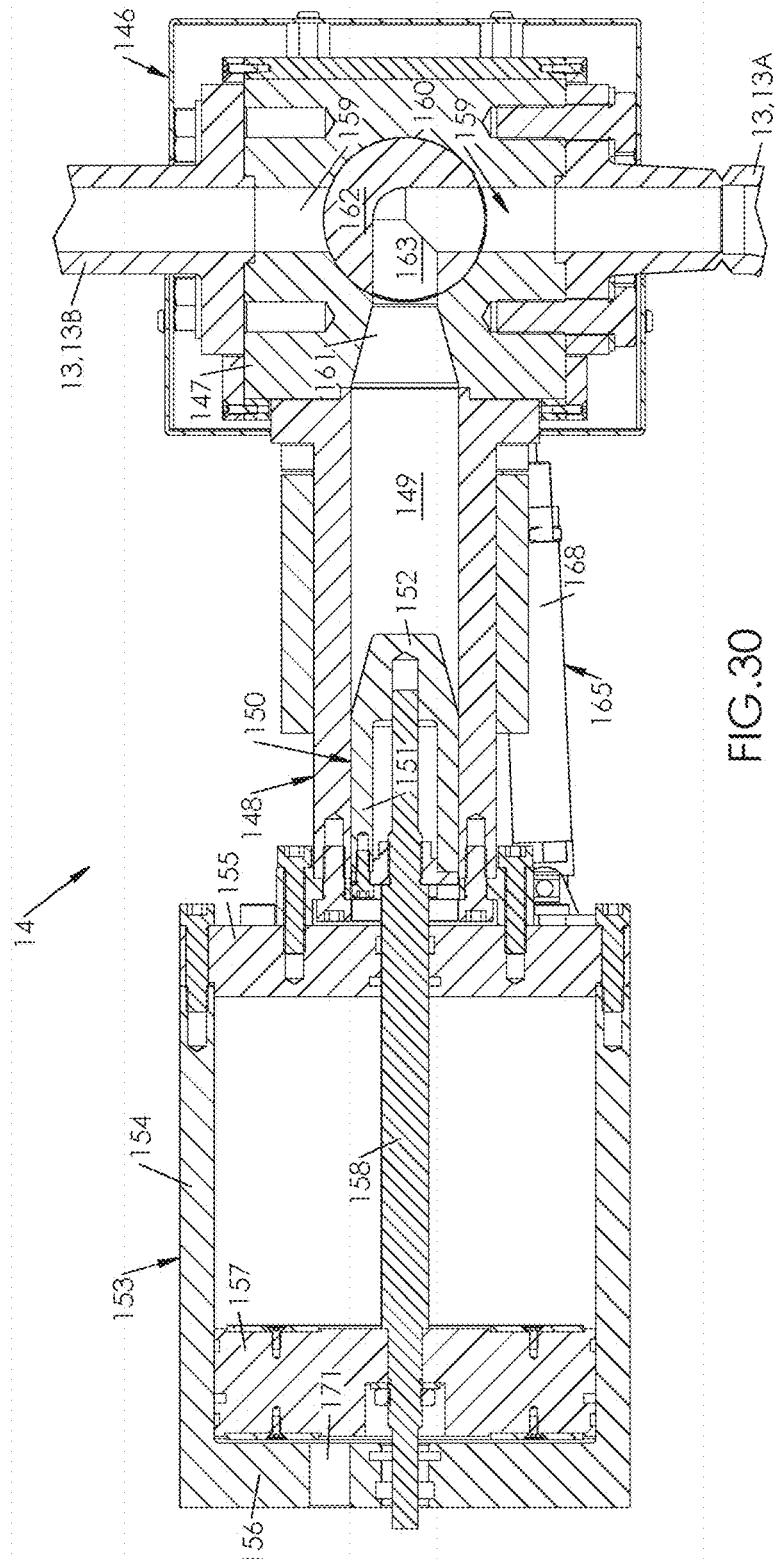
FIG. 30 is a cutaway view similar to FIG. 29, showing the injection device in a final position for sampling a dose of material coming from the extruder.

As FIGS. 28 and 29 show, the dosimetric injection device 14 comprises:

A valve 146 inserted on the feed pipe 13 that it divides into an upstream cross-section 13A, which connects to the rotary joint 11, and a downstream cross-section 13B, which connects to the distribution circuit 40 of the molding unit 4, with the valve comprising a body 147 that is integral with the upstream cross-section 13A and with the downstream cross-section 13B by means of flanges, A metering cylinder 148, integral with the body 147 of the valve 146 and defining a cylindrical inner chamber 149, A plunger 150 mounted to slide in the metering cylinder 148; this plunger 150 has a cylindrical body 151 with an outer diameter corresponding (aside from the play) to the inner diameter of the metering cylinder 148, and a tapered head 152, A jack 153 for controlling the position of the plunger 150, integral with the cylinder 148 and that comprises a jacket 154 that is closed by a front wall 155 and a rear wall 156, a piston 157 mounted to slide in the jacket 154, and a rod 158 passing through the walls 155, 156 and having a central portion on which the piston 157 is attached, and a front end by which the rod 158 is integral with the plunger 150.

The body 147 of the valve 146 is penetrated by a pipe 159 for a fluid connection of the upstream cross-section 13A to the downstream cross-section 13B. The body 147 is furthermore penetrated by a bore 160 that is perpendicular to the connecting pipe 159 and into which the latter empties, and a lateral opening 161 emptying, from one side, into the bore 160 perpendicular to the connecting pipe 159 and, from the opposite side, into the chamber 149 of the metering cylinder 148. As FIGS. 29 and 30 clearly show, the opening 161 defines a tapered seat against which the head 152 of the plunger 150 can be applied.

The valve 146 is of the three-way L-shaped type and comprises a cylindrical plug 162 that is penetrated by an L-shaped elbowed channel 163, mounted in rotation in the bore 160 between a load position (FIG. 30) in which the channel 163 puts the upstream cross-section 13A of the feed pipe 13 into fluidic communication with the chamber 149, and an injection position, in which, with the plug 162 having carried out a quarter-turn rotation in the bore 160, the channel 163 puts the chamber 149 into fluidic communication with the downstream cross-section 13B of the feed pipe 13.

Figure 31:
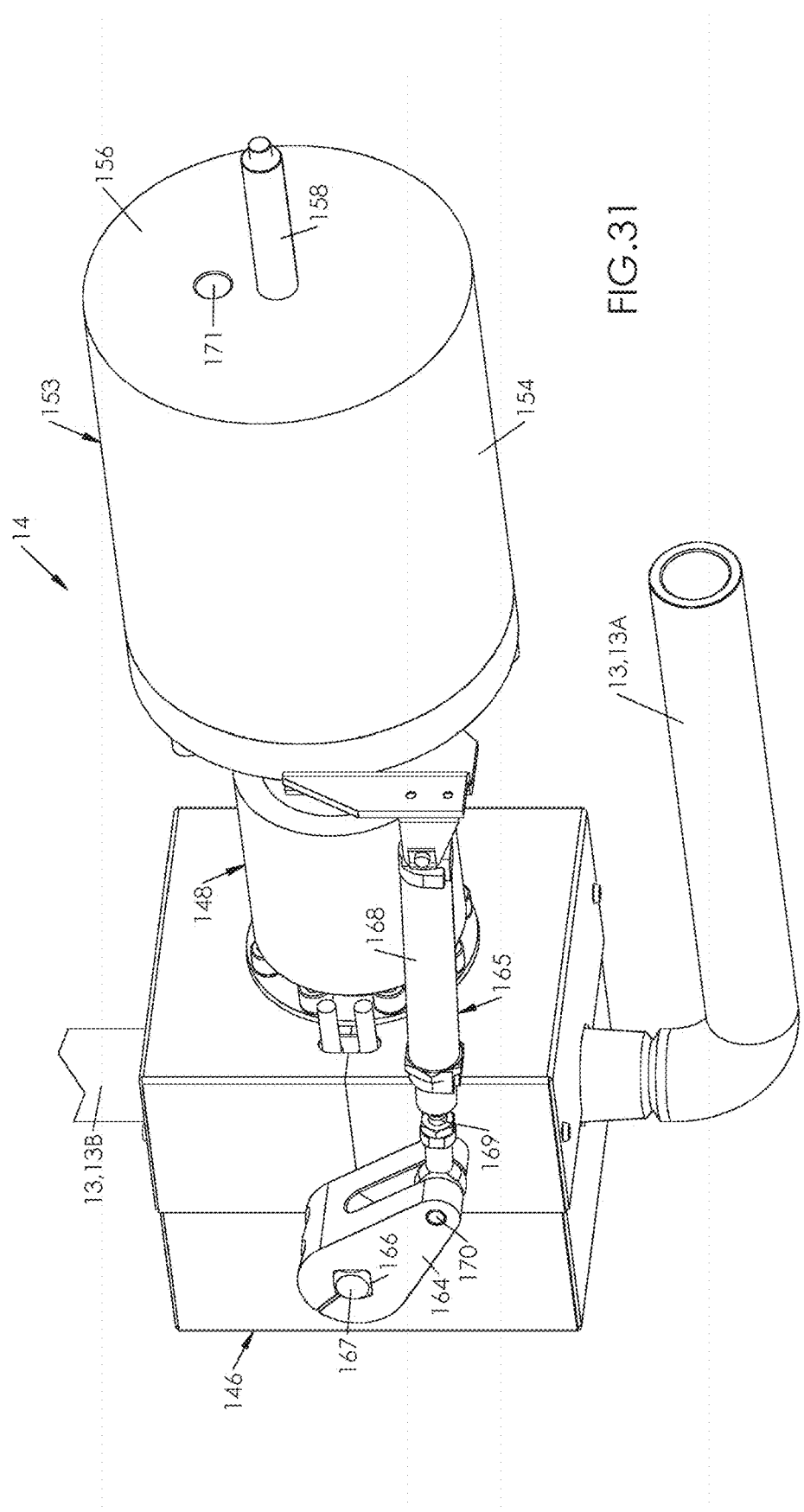
FIG. 31 is a view similar to FIG. 28, showing the injection device in an injection position of the dose toward the molding unit.
Figure 32:
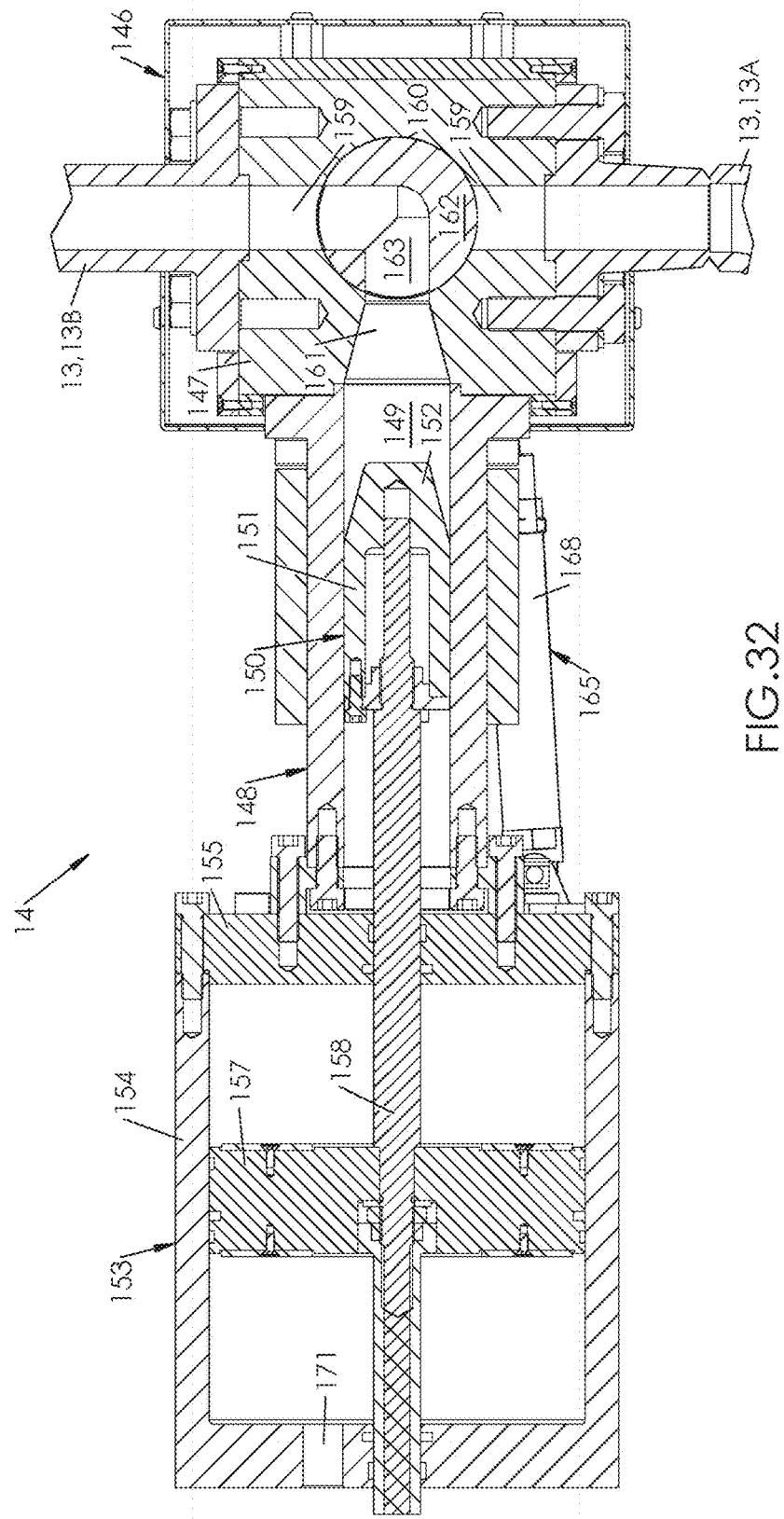
FIG. 32 is a cutaway view similar to FIGS. 29 and 30, showing the injection device in an injection position of the dose toward the molding unit.
Figure 33:
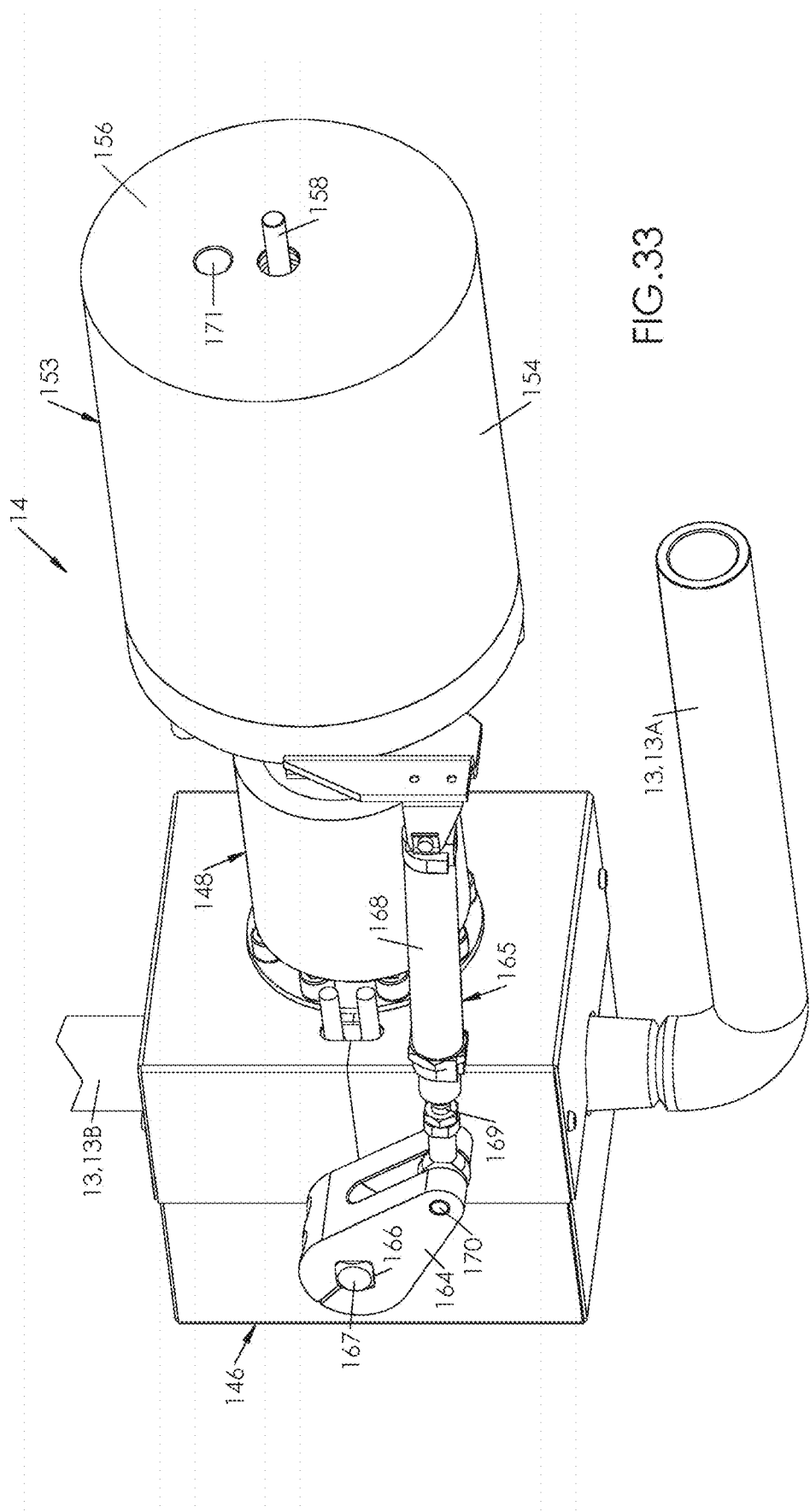
FIG. 33 is a view similar to FIGS. 28 and 31, showing the injection device in a final injection position of the dose toward the molding unit.
Figure 34:
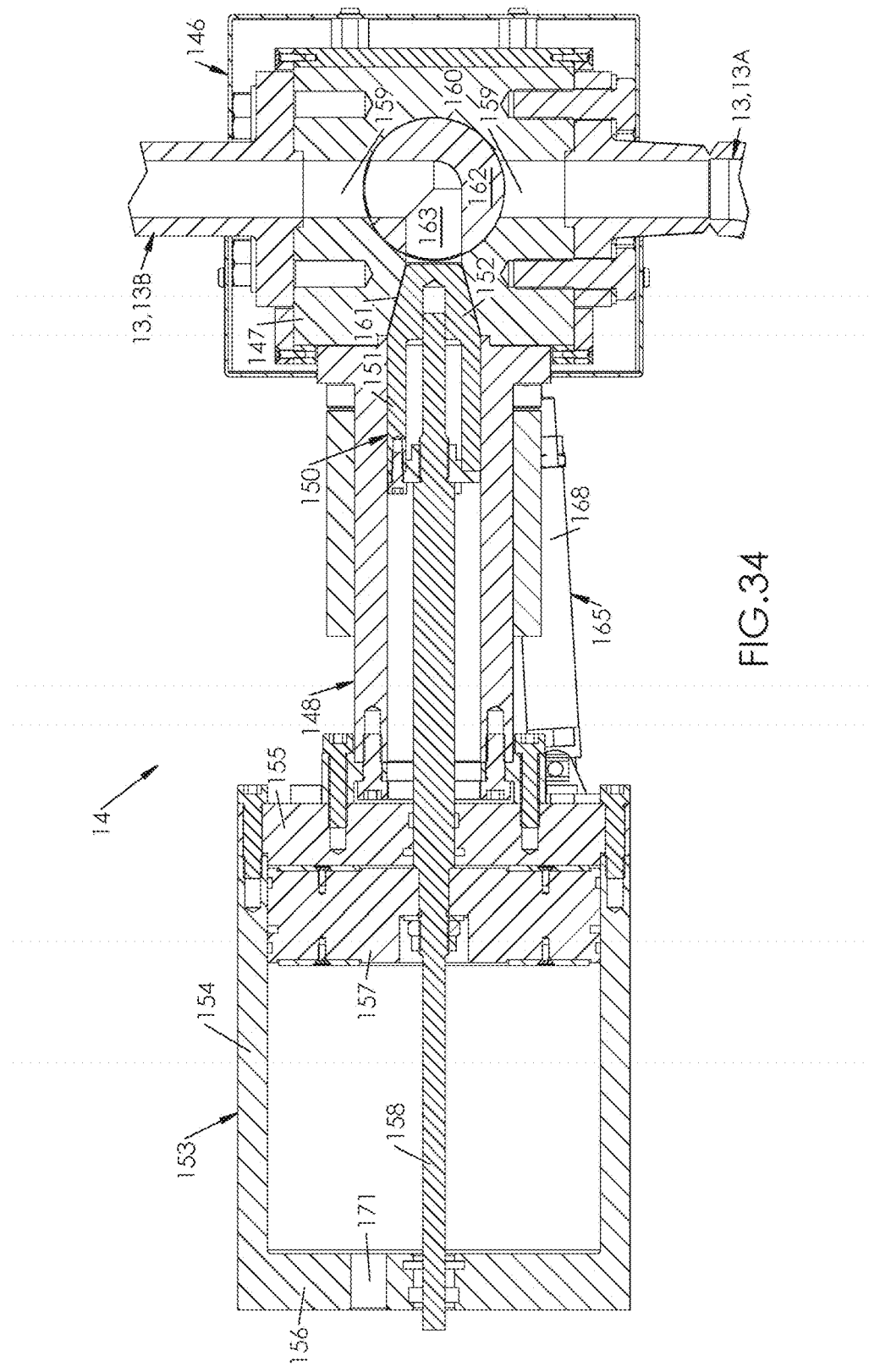
FIG. 34 is a cutaway view similar to FIGS. 29, 30 and 32, showing the injection device in a final position of injection of the dose toward the molding unit.

To control the rotation of the plug 162, the dosimetric injection device 14 comprises a lever 164 that is integral in rotation with the plug 162, coupled to a control jack 165, as illustrated in FIGS. 28, 31 and 33.

More specifically, the lever 164 has an imprint 166 with a square cross-section, in which a complementary end fitting 167 is engaged (also with a square cross-section) that is integral with the plug 162. The control jack 165 comprises a jack body 168 that is integral with the jacket 154, and a rod 169 coupled in rotation with the lever 164 by means of an axis 170.

In an extended position of the rod 169, the jack 165 places the plug 162 in its load position (FIGS. 28, 29). In a retracted position of the rod 169, the jack 165 places the plug 162 in its injection position (FIGS. 31 to 34).

The plunger 150 is mounted to slide in the metering cylinder 148 between an advanced position (FIGS. 29, 34) in which the head 152 of the plunger 150 is applied against the opening 161 that it thus blocks, and a retracted position (FIG. 30) in which the plunger 150 is separated from the opening 161, the volume thus jointly defined by the chamber 149 and the opening 161 between the head 152 of the plunger 150 and the plug 162 corresponding to a dose of material that is necessary to the forming of a preform 2.

Likewise, the piston 157 is mounted to slide in the jacket 154 between an advanced position (FIGS. 29, 34) in which the piston 157 abuts against the front wall 155 and a retracted position (FIG. 30) in which the piston 157 abuts against the rear wall 156.

The dosimetric injection device 14 operates in the following manner.

Starting from an initial configuration of the injection device 14, in which the plug 162 is in its load position and the plunger 150 is in its advanced position (FIG. 29), the melted plastic material (in the fluid state, under pressure), pushed by the screw from the cylinder 7 of the extruder 5, circulates in the cross-section 13A upstream from the feed pipe 13 and in the elbowed channel 163 of the plug 162, and pushes the plunger 150 back toward its retracted position. The piston 157 is integrally driven by the plunger 150 toward its retracted position until abutting against the rear wall 156. In the retracted position of the piston 157 (and therefore of the plunger 150), the chamber 149 and the lateral opening 161 are filled by a volume of plastic material corresponding to the dose that is required for forming a preform 2.

The control jack 165 then places the plug 162, by a quarter-turn movement, into its injection position.

Then, the movement of the piston 157 from its retracted position toward its advanced position is controlled by the injection in the jacket 154 of a fluid (such as air, water or oil) under pressure, through a hole 171 made in the rear wall 156. The movement of the piston 157 integrally drives the movement of the plunger 150, via the rod 158, from its retracted position toward its advanced position, until the piston 157 reaches its advanced position, abutting against the front wall 155, with the plunger 150 then reaching its advanced position with its head 152 abutting against the opening 161. The advanced movement of the plunger 150 brings about the injection of the dose of material in the downstream cross-section 13B of the feed pipe 13. Thus, a dose of material is injected into the mold 106 for forming a preform 2.

The operation of the molding unit 4, starting from an initial configuration in which the carriage 61 is in its top (demolding) position and the core holder 62 is in its primary alignment position, as illustrated in FIG. 2, is now described.

In this configuration:

The dosimetric injection device 14 is in progress (or at the end) of metering;

The piston 42 of the injector 41 is in the blocking position;

The cam follower 77 of the carriage 61 is in the raised portion 79 of the upper cam groove 76;

The primary cores 64A are located in their primary alignment position, perpendicular to their respective mold bodies 29 and in the axis of the latter;

The secondary cores 64B are located in their secondary alignment position, from the outer side of the molding unit 4; as FIG. 2 shows, the secondary cores 64B are covered by preforms 2 that were just molded;

The drawers 47 are in the demolding position;

The support 115 of the gripping device 111 is in the top position, and the combs 119, 121 are in the release position, with the support 115 being kept in this position by cooperation of the rollers 144 with the lower slots 140A (FIG. 6), and the combs 119, 121 being kept in release position by cooperation of their respective rollers 131 with the narrow cross-sections 130 of the lateral cam grooves 128;

The bolts 85 of the locks 81 are in the unlocking position;

The stop 108 of the shoring-up device 107 is in its inactive position;

The peg 104 of the actuator 103 is in its top position and the extractor 93 is in its rest position.

The rotation of the molding unit 4 entrained by the carrousel 3 brings about the lowering of the movable apparatus 60 as soon as the cam follower 77 of the carriage 61 rolls over a descending portion 172 of the upper cam groove 76, joining the raised portion 79 to a bottom portion 78.

The lowering of the movable apparatus 60 brings about the penetration of the primary cores 64A in their respective mold bodies 29, the oblique movement of the drawers 47 toward their molding position, by rolling contact of the support elements 90 on the rollers 53 and the axial introduction, in the clamps 123, of the previously molded preforms 2, carried by the secondary cores 64B (FIG. 13).

When the carriage 61 reaches its molding position, the molds 106 are constituted (by assembly of the mold bodies 29, half-rings 48 and pushers 96). The heads 24 of the columns 22 are accommodated in the screeds 82. The preforms 2 hooked to the secondary cores 64B work with the clamps 123 in their respective necks 17. The locks 81 are then moved, under the action of their jacks 86, toward their locking position, which ensures the locking of the carriage 61 on the columns 22 (and therefore on the frame 19). The cam follower 135 is moved downward, by cooperation with the lower cam groove 132, which brings about the closing of the clamps 123 around preforms 2 under their respective necks 17 (FIG. 14). The shoring-up device 107 is activated, the stop 108 being moved by its jack 110 toward its active position in which it is applied against the crosspiece 109.

The injection of the material into the molds 106 is then controlled, by rotation of the plug 162 toward its injection position, movement of the plunger 150 toward its advanced position (FIGS. 32, 33), and integral movement of the piston 42 of the injector 41 toward its injection position. The material penetrates into each mold 106 through the hole 39 released by the movement of the needle 43 that is integral with the piston 42. In parallel, the uncovering device 92 is activated, with the peg 104 being moved toward its bottom position, which, by resting the peg 104 on the pin 98, moves the extractor 93 toward its bottom position to disengage the preforms 2 from their respective cores 64B. The extractor 93 is applied against the pad 138 and entrains, by resting against the latter, the support 115 toward its bottom position (cf. FIG. 21). The lowering of the support 115 brings about the exit of the rollers 131 from the narrow cross-sections 130 of the lateral cam grooves 128 and, under the action of the return spring 127, the translation of the combs 119, 121 on the crosspiece 118 toward their gripping position, where each preform 2 is held by a clamp 123 formed by two jaws 120, 122 that are thus mutually drawn toward one another.

At the same time, the cam follower 135 of the support 115 is free relative to the groove 132 of the lower cam groove—thus allowing a fast vertical movement of the support 115—and the rollers 144 pass through the oblique lower cross-sections 141 of the guides 139 by contributing, under the action of the spring 145, to supporting the support 115 by preventing its free fall, as already mentioned above.

Figure 17:
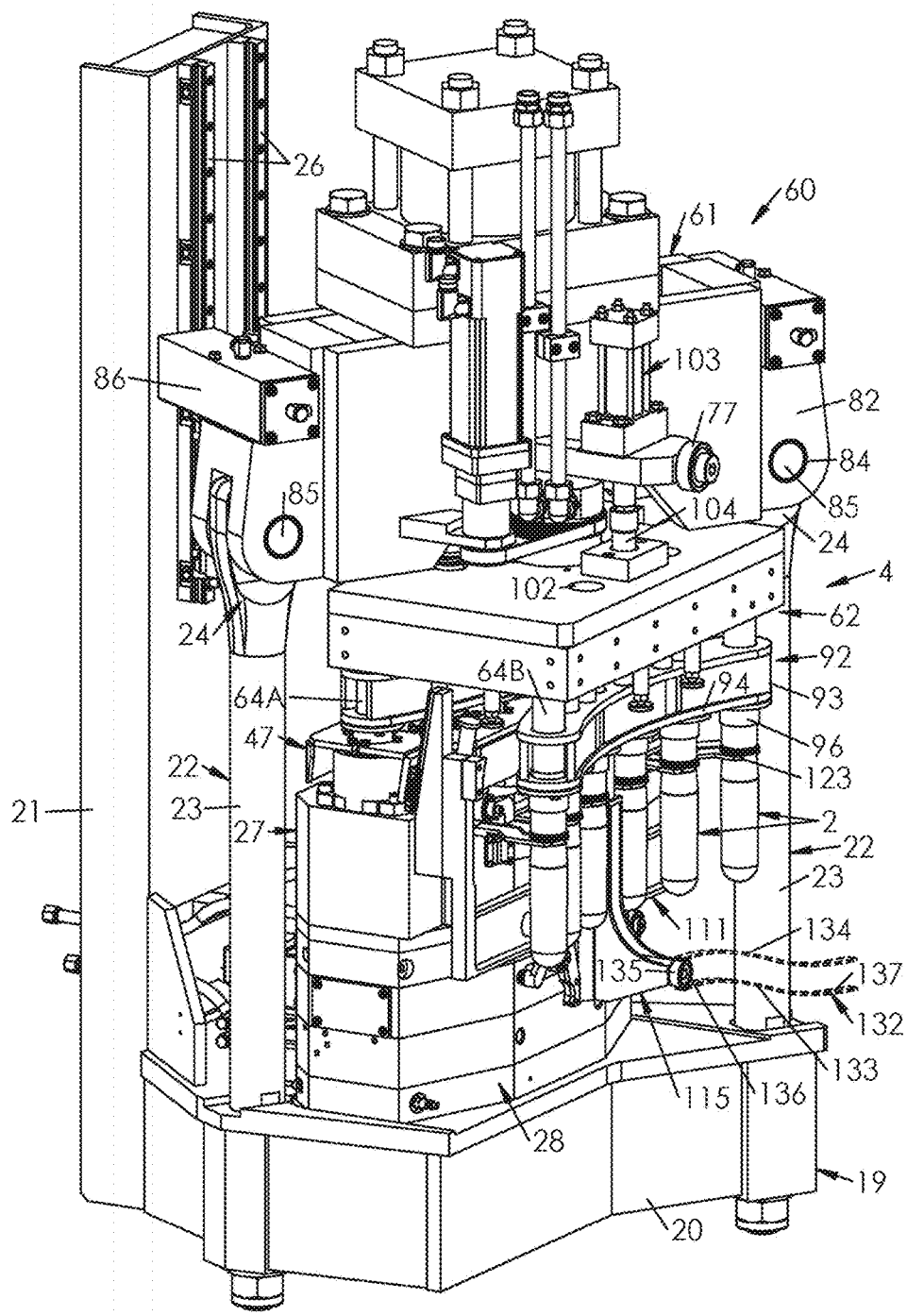
FIG. 17 is a view similar to FIG. 14, illustrating the uncovering of preforms having been molded in the preceding molding cycle and their being picked up by movable clamps.
Figure 24:
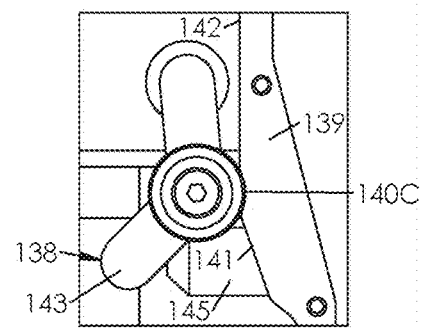
FIG. 24 is a detail view of the mold holder block of FIG. 22, according to the insert XXIV.

As FIGS. 17, 22 and 24 show, the support 115 is not necessarily moved immediately to its bottom position, but to an intermediate position in which the rollers 144 work with the intermediate slots 140C. The temporary hold (along an angular portion of the travel of the molding unit 4) in this intermediate position makes it possible to stabilize the preforms 2 on the clamps 123 and thus to prevent any drop or, at the very least, any poor positioning of a preform 2 on its clamp 123.

After the injection of preforms 2 into the molds 106 is ended, and optionally after a timing making it possible for the material to cool slightly to prevent any malformation of the preforms 2, the movable apparatus can rise toward its demolding position. The piston 42 of the injector 41 is put back into its blocking position, in which the needle 43 blocks the hole 39 in the cavity 32.

Figure 25:
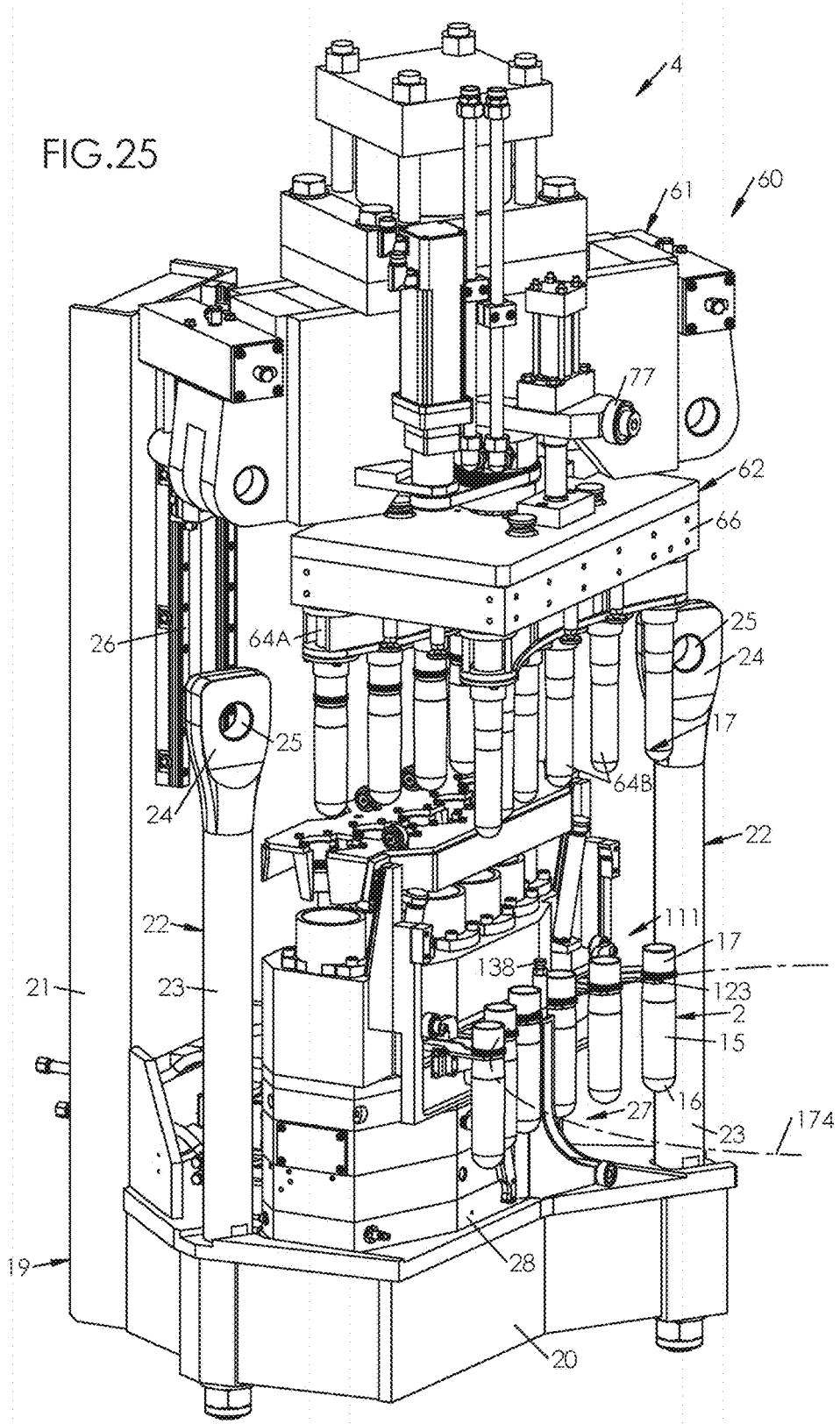
FIG. 25 is a view similar to FIG. 14, showing the molding unit in the demolding position.
Figure 26:
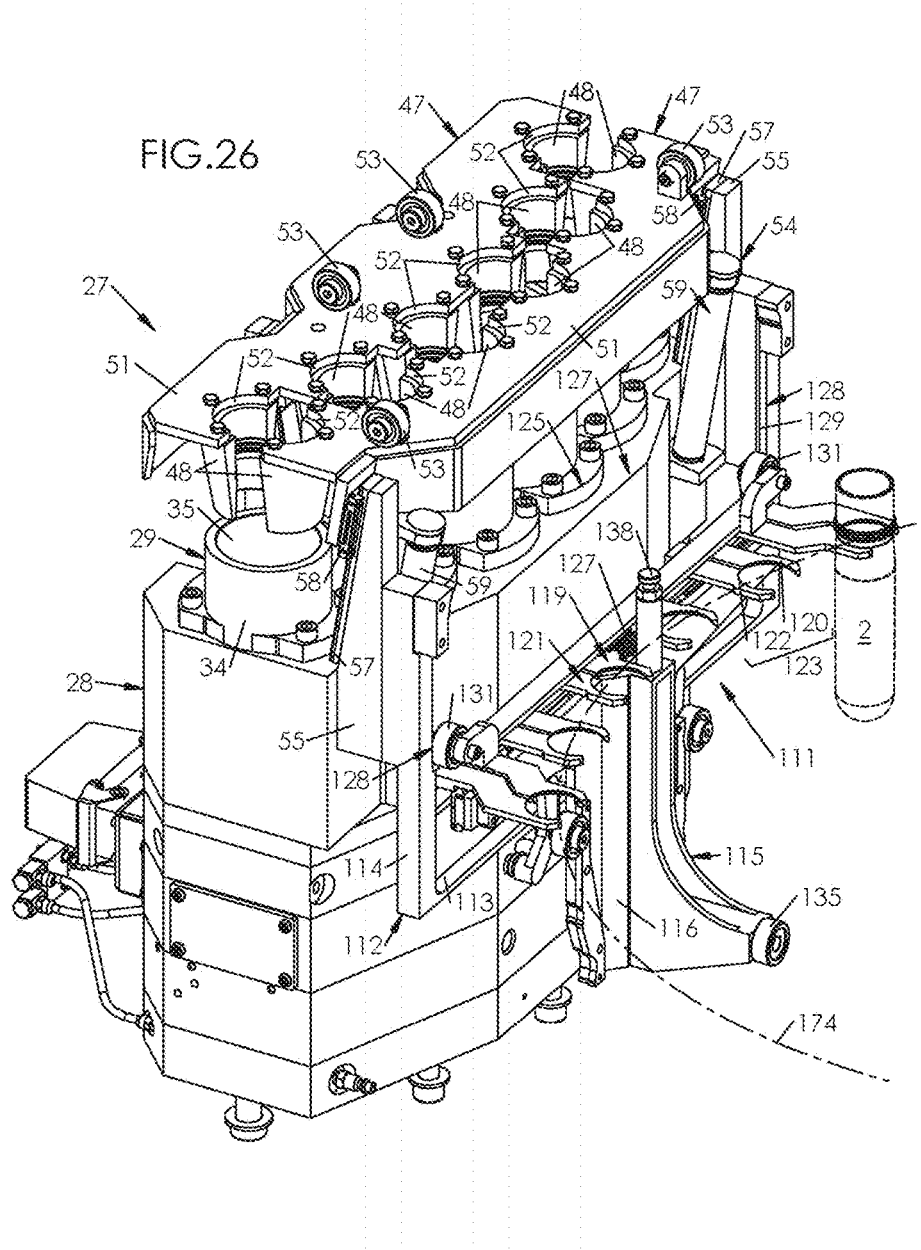
FIG. 26 is a view similar to FIG. 15, illustrating the mold holder of the molding unit in the demolding position of FIG. 25.

The locks 81 are put back into their unlocking position, which makes possible the disengagement of the screeds 82 from the columns 22. The cam follower 77 of the carriage 61 passes through a rising portion 173 of the upper cam groove 76, which moves the carriage 61 (and therefore the entire movable apparatus 60) toward the demolding position. The preforms 2 that are hardly formed are demolded; the cooling of the material brings about the retraction of the material and the adhesion of each preform 2 to its core (in this case, a primary core 64A). The stop 108 of the shoring-up device 107 is put back into its inactive position. Under the action of the return springs 59, the drawers 47 find their demolding position, the molds 106 thus being separated. The peg 104 of the uncovering device is put back by the jack 103 into its top position, which, by the action of the return springs 100, makes it possible for the extractor 93 of the outer side to find its rest position again. In parallel, the support 115 resumes its descent, under the action of the cam follower 135 that passes through a downward portion of the lower cam groove 132, which first of all brings about the exit of the rollers 144 from the intermediate slots 140C, and then the movement of the support 115 to its bottom position, in which the rollers 144 work with the upper slots 140B (FIGS. 25 and 26). More specifically, the end of the travel of the support 115 in its downward movement is ensured by the lower flange 133 and the upper flange 134 between which the roller 135 is required to move (FIG. 17). The roller 135, entered into the cam groove 132 by the top portion 136 of the latter, is moved toward the bottom portion 137, which drives the support 115 toward its bottom position. During this time, the rollers 144 pass through the straight cross-sections 142 of the guide 139, and, in the absence of a (resistant) vertical component of force, they therefore do not oppose this downward movement of the support 115.

The secondary cores 64B are thus completely uncovered from their respective preforms 2, which remain hooked to the clamps 123 until being unhooked by a transfer device 174, such as a wheel (illustrated in thick broken lines in FIGS. 25 and 26). The transfer is facilitated when this wheel 174 has a radius of curvature that is identical to the radius of the arc along which the clamps 123 are arranged. The unhooking is performed by simple traction on the preforms 2, with the jaws 120, 122 being separated elastically in opposition to the return spring 127.

Figure 27:
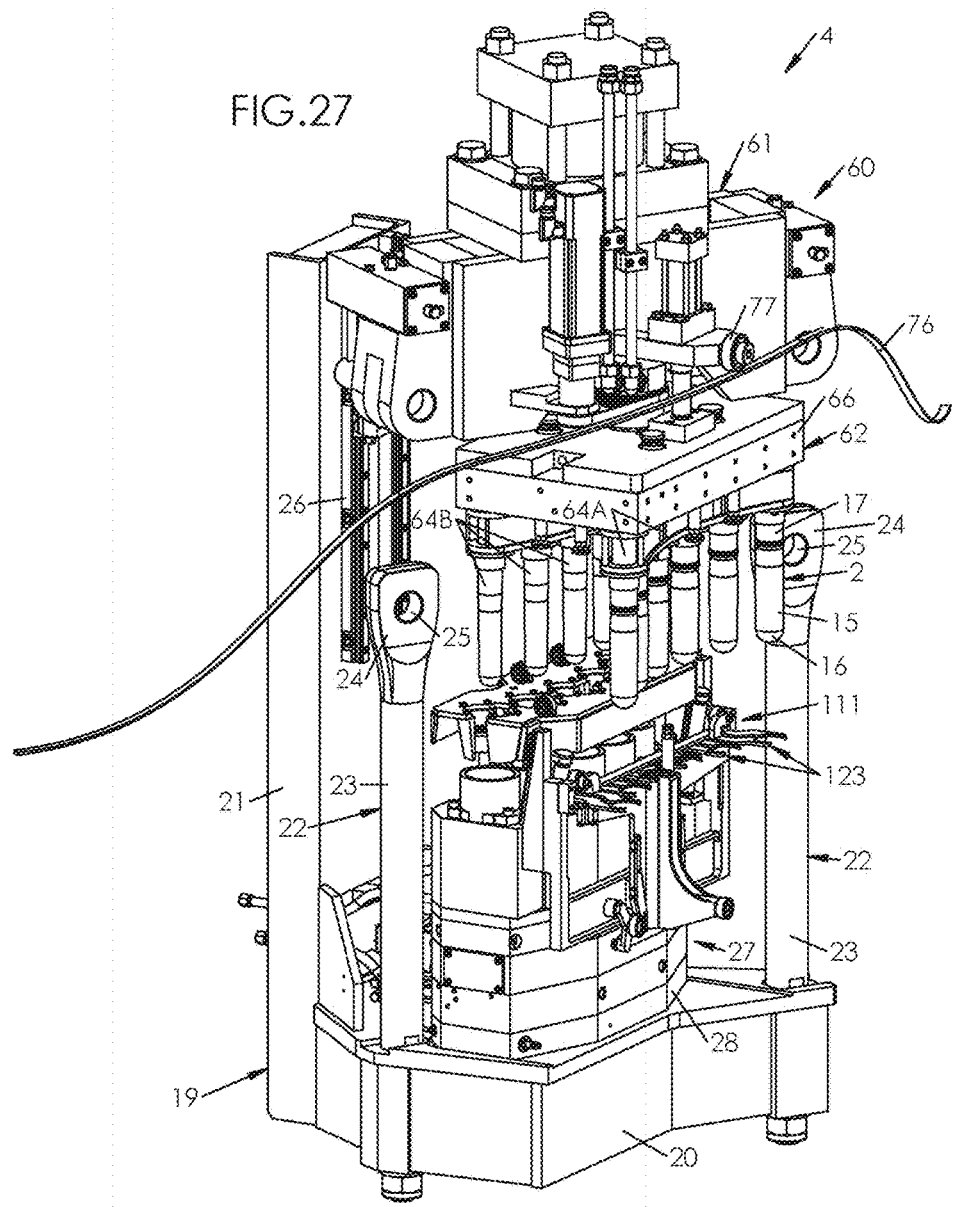
FIG. 27 is a view similar to FIG. 26, showing the molding unit at the end of the cycle, in a configuration that is similar to FIG. 2, but after rotation of the core holder and transposition of the cores.

The rotation by a half-turn of the core holder 62 around the central shaft 63 is then controlled. For this purpose, the shaft 72 of the motor 71 is driven in rotation, which, via the pinion 73, the belt 74, and the ring gear 69, brings about the rotation of the core holder 32. The angular travel of the shaft 72 is predetermined; it depends on the ratio of the diameters of the pinion 73 and the ring gear 69. In the illustrated example, where this ratio is 1/2, the rotation by a half-turn of the ring 69 is carried out by rotation by a complete turn of the pinion 73. This rotation brings about the transposition of the primary cores 64A and the secondary cores 64B (FIG. 27). Before (or, preferably, during) this rotation, the plug 162 of the dosimetric injection device 14 is put back into its load position, which brings about the preparation of a new dose of material. In parallel, the support 155 finds its top position again by upward movement of the roller 135 in cooperation with a rising portion of the lower cam groove 132.

With the designation "primary" and "secondary" being purely arbitrary, the configuration in which the molding unit, illustrated in FIG. 27, is then found is similar to the initial configuration illustrated in FIG. 2. The injection cycle that was just described can then resume.

The molding unit 4 described above ensures multiple advantages.

First of all, we have seen that the same mold body 29 is common to two cores 64A, 64B (respectively primary and secondary), a half-revolution of the core holder 62 making it possible to transport them to immediately reconstitute an injection mold 106 during the extraction of the preform 2, which was just injected. The structure of the molding unit 4 therefore makes it possible to pool a part of the equipment (in this case, the mold bodies 29), enhancing productivity, since, in a complete molding cycle, the same mold body 29 is used twice. The same holds true for drawers 47 that, integrated with the mold holder 27 by being carried by the mold-holder block 28, are pooled since they are common to all of the rows of cores 64A, 64B. The result is in particular an essential lightening of movable masses.

Secondly, the pooling of the equipment makes it possible, with equal production, to limit the number of parts and the space requirement of the molding unit 4. It will be noted that the reduction of the mass of the molding unit 4 proportionally reduces its inertia, which makes it possible to increase the speed of rotation of the carrousel 3 and therefore to increase the production rates. As a result, the preforms 2 that are produced can be introduced directly into a cycle for manufacturing containers. In other words, the molding machine 1 can be directly integrated with a container production line, without intermediate storage of the formed preforms. The result is in particular an improvement of the energy yield of such a production line, since the temperature of the preforms 2 obtained from the machine 1 is already much higher than the ambient temperature, with the thermal conditioning carried out in the heating unit being limited to raising the temperature of preforms 2 from approximately twenty to thirty degrees (contrary to a conventional production line in which the preforms previously injected and stored for an undetermined period—generally several days—are discharged in bulk into a hopper from which they are extracted and then put into rows before undergoing a consistent thermal conditioning consisting in raising their temperature by about 100 degrees).

Thirdly, the pooling of the mold bodies 29 induces a reduction of the number of feed pipes 13, which makes it possible to simplify the structure of the rotary joint and to facilitate its maintenance.

It will be noted that, although the described use of the machine 1 corresponds to a molding of the preforms 2 by injection, this machine 1 also makes it possible to carry out a molding of the preforms 2 by injection-compression.

In this second use, the carriage 61 is temporarily immobilized in an intermediate position, slightly raised in relation to the bottom position, and in which the core 64A or 64B is partially housed in the mold body 29. The injection of the plastic material is then controlled in this intermediate position of the carriage 61, and then the latter is moved toward its bottom position to compress the material that is thus injected. The result is in particular a better imprint-taking of the preforms 2, enhancing the final quality of the containers.

The invention claimed is:

1. Unit (4) for molding preforms (2) made of plastic material, with each preform (2) having a body (15) and a neck (17) in the extension of the body (15), with this unit (4) comprising:
   A frame (19),
   A mold holder (27) that is integral with the frame (19) and that carries at least one mold body (29) bearing the imprint of an outer face (33) of the body (15) of the preform (2), with this mold body (29) extending around a molding axis (M);
   A movable apparatus (60) including a carriage (61) and at least one oblong core (64A, 64B) bearing the imprint of an inner face (65) of the body (15) of the preform (2), with the carriage (61) being mounted to move in relation to the frame (19) between:
      A molding position in which the core (64A, 64B) is housed in the mold body (29), and
      A demolding position in which the core (64A, 64B) is axially separated from the mold body (29),
   wherein the movable apparatus (60) also comprises:
   A core holder (62) mounted on the carriage (61), with this core holder (62) carrying at least one primary core (64A) and one secondary core (64B) and being movable in rotation in relation to the carriage (61), in the demolding position of the latter, around an axis (R) of rotation that is parallel to the molding axis (M), between:
      A first alignment position in which the primary core (64A) extends in the alignment of the mold body (29) while the secondary core (64B) is offset in relation to the mold body (29), and
      A second alignment position in which the primary core (64A) and the secondary core (64B) are transposed;
   said unit (4) further comprising a shoring-up device (107) including a stop (108) mounted to move between an active position in which the stop (108) rests against the core holder (62) perpendicular to the mold holder (27), and an inactive position in which the stop (108) is separated from the core holder (62).

2. Molding unit (4) according to claim 1, wherein the carriage (61) is mounted in translation in relation to the frame (19).

3. Molding unit (4) according to claim 1, wherein the mold holder (27) includes a number of mold bodies (29), and the core holder (62) carries a number of primary cores (64A) and a number of secondary cores (64B).

4. Molding unit (4) according to claim 3, wherein the mold holder (27) carries a row of mold bodies (29).

5. Unit (4) for molding preforms (2) made of plastic material, with each preform (2) having a body (15) and a neck (17) in the extension of the body (15), with this unit (4) comprising:
   A frame (19),
   A mold holder (27) that is integral with the frame (19) and that carries at least one mold body (29) bearing the imprint of an outer face (33) of the body (15) of the preform (2), with this mold body (29) extending around a molding axis (M);
   A movable apparatus (60) including a carriage (61) and at least one oblong core (64A, 64B) bearing the imprint of an inner face (65) of the body (15) of the preform (2), with the carriage (61) being mounted to move in relation to the frame (19) between:
      A molding position in which the core (64A, 64B) is housed in the mold body (29), and
      A demolding position in which the core (64A, 64B) is axially separated from the mold body (29),
   wherein the movable apparatus (60) also comprises:
   A core holder (62) mounted on the carriage (61), with this core holder (62) carrying at least one primary core (64A) and one secondary core (64B) and being movable in rotation in relation to the carriage (61), in the demolding position of the latter, around an axis (R) of rotation that is parallel to the molding axis (M), between:
      A first alignment position in which the primary core (64A) extends in the alignment of the mold body (29) while the secondary core (64B) is offset in relation to the mold body (29), and
      A second alignment position in which the primary core (64A) and the secondary core (64B) are transposed;
   wherein the mold holder (27) includes a number of mold bodies (29), and the core holder (62) carries a number of primary cores (64A) and a number of secondary cores (64B); and
   wherein the mold bodies (29) are placed side by side along a curved line.

6. Molding unit (4) according to claim 1, further comprising a pair of drawers (47), each carrying at least one neck half-ring (48) having an inner face (49) bearing the imprint of the neck (17) of a preform (2) and a tapered outer face (50), each drawer (47) being movable in relation to the mold holder (27) between a molding position in which the or each half-ring (48) is housed in a tapered reserve (35) formed projecting over the mold body (29), and a demolding position in which the or each half-ring (48) is separated from the tapered reserve (35).

7. Molding unit (4) according to claim 6, wherein each drawer (47) is mounted in translation in relation to the mold holder (27) on a guiding axis (G) that is inclined in relation to the molding axis (M).

8. Unit (4) for molding preforms (2) made of plastic material, with each preform (2) having a body (15) and a neck (17) in the extension of the body (15), with this unit (4) comprising:
   A frame (19),
   A mold holder (27) that is integral with the frame (19) and that carries at least one mold body (29) bearing the imprint of an outer face (33) of the body (15) of the preform (2), with this mold body (29) extending around a molding axis (M);
   A movable apparatus (60) including a carriage (61) and at least one oblong core (64A, 64B) bearing the imprint of an inner face (65) of the body (15) of the preform (2), with the carriage (61) being mounted to move in relation to the frame (19) between:
      A molding position in which the core (64A, 64B) is housed in the mold body (29), and
      A demolding position in which the core (64A, 64B) is axially separated from the mold body (29),
   wherein the movable apparatus (60) also comprises:
   A core holder (62) mounted on the carriage (61), with this core holder (62) carrying at least one primary core (64A) and one secondary core (64B) and being movable in rotation in relation to the carriage (61), in the demolding position of the latter, around an axis (R) of rotation that is parallel to the molding axis (M), between:
      A first alignment position in which the primary core (64A) extends in the alignment of the mold body (29) while the secondary core (64B) is offset in relation to the mold body (29), and
      A second alignment position in which the primary core (64A) and the secondary core (64B) are transposed;
   said unit (4) further comprising a pair of drawers (47), each carrying at least one neck half-ring (48) having an inner face (49) bearing the imprint of the neck (17) of a preform (2) and a tapered outer face (50), each drawer (47) being movable in relation to the mold holder (27) between a molding position in which the or each half-ring (48) is housed in a tapered reserve (35) formed projecting over the mold body (29), and a demolding position in which the or each half-ring (48) is separated from the tapered reserve (35); and
   said unit (4) further comprising, for each drawer (47), a return spring (59) mounted parallel to the guiding axis (G) and which drives the drawer (47) toward its demolding position, wherein each drawer (47) carries a roller (53), and the core holder (62) carries a support element (90) that, during the movement of the core holder (62) toward its molding position, pushes, by application against the roller (53), the drawer (47) back towards its molding position in opposition to the return spring (59).

9. Molding unit (4) according to claim 6, further comprising a device (92) for uncovering each molded preform (2) in a demolding position of the core holder (62).

10. Molding unit (4) according to claim 9, wherein the uncovering device (92) comprises:
   An extractor (93) equipped with a pusher (96) mounted in translation on each core (64A, 64B), with this extractor (93) being movable in translation in relation to each core (64A, 64B) between a rest position and an extraction position,
   A peg (104) mounted in translation in relation to the core holder (62), between a rest position, in which the peg (104) is separated from the extractor (93) and makes it possible for the latter to adopt its rest position, and an extraction position, in which the peg (104) rests against the extractor (93) and places the latter in its extraction position to disengage the molded preform (2) from the core (64A, 64B).

11. Molding unit (4) according to claim 9, further comprising a device (111) for gripping molded preforms (2) extracted from the core holder (62), with this gripping device (111) comprising a first comb (119) carrying at least a first jaw (120) and a second comb (121) carrying at least a second jaw (122) defining, with the first jaw (120), a clamp (123) for gripping a preform (2), with the combs (119, 121) being mounted to move in relation to one another between a gripping position in which the jaws (120, 122) are drawn toward one another, and a release position in which the jaws (120, 122) are separated.

12. Unit (4) for molding preforms (2) made of plastic material, with each preform (2) having a body (15) and a neck (17) in the extension of the body (15), with this unit (4) comprising:
   A frame (19),
   A mold holder (27) that is integral with the frame (19) and that carries at least one mold body (29) bearing the imprint of an outer face (33) of the body (15) of the preform (2), with this mold body (29) extending around a molding axis (M);
   A movable apparatus (60) including a carriage (61) and at least one oblong core (64A, 64B) bearing the imprint of an inner face (65) of the body (15) of the preform (2), with the carriage (61) being mounted to move in relation to the frame (19) between:
      A molding position in which the core (64A, 64B) is housed in the mold body (29), and
      A demolding position in which the core (64A, 64B) is axially separated from the mold body (29),
   wherein the movable apparatus (60) also comprises:
   A core holder (62) mounted on the carriage (61), with this core holder (62) carrying at least one primary core (64A) and one secondary core (64B) and being movable in rotation in relation to the carriage (61), in the demolding position of the latter, around an axis (R) of rotation that is parallel to the molding axis (M), between:
      A first alignment position in which the primary core (64A) extends in the alignment of the mold body (29) while the secondary core (64B) is offset in relation to the mold body (29), and
      A second alignment position in which the primary core (64A) and the secondary core (64B) are transposed;
   said unit (4) further comprising a device (111) for gripping molded preforms (2) extracted from the core holder (62), with this gripping device (111) comprising a first comb (119) carrying at least a first jaw (120) and a second comb (121) carrying at least a second jaw (122) defining, with the first jaw (120), a clamp (123) for gripping a preform (2), with the combs (119, 121) being mounted to move in relation to one another between a gripping position in which the jaws (120, 122) are drawn toward one another, and a release position in which the jaws (120, 122) are separated; and wherein the gripping device (111) comprises a return spring (127) that drives the combs (119, 121) toward the gripping position, the mold holder (27) carries a pair of cam grooves (128), and each comb (119, 121) carries a cam follower (131) that works with a cam groove (128) of which a narrow cross-section (130) places the combs (119, 121) in their release position in opposition to the return spring (127).

13. Machine (1) for molding preforms made of plastic material, which comprises:

A rotating carrousel (3),

A number of molding units (4) according to claim 1, mounted on the carrousel (3), An extruder (5), A rotary joint (11) equipped with an input (10) connected to the extruder (5), and a number of outputs (12) each connected to a molding unit (4) by a feed pipe (13) for delivering the plastic material therein.

14. Machine (1) according to claim 13, which also comprises a device (14) for dosimetric injection of the material coming from the extruder (5), with this dosimetric injection device (14) comprising a three-way valve (146) inserted into the feed pipe (13), a metering cylinder (148), a plunger (150) mounted in translation in the metering cylinder (148), a jack (153) for controlling the translation of the plunger (150), and a jack (165) for controlling the position of the valve (146).

15. Unit (4) for molding preforms (2) made of plastic material, with each preform (2) having a body (15) and a neck (17) in the extension of the body (15), with this unit (4) comprising:

A frame (19),

A mold holder (27) that is integral with the frame (19) and that carries at least one mold body (29) bearing the imprint of an outer face (33) of the body (15) of the preform (2), with this mold body (29) extending around a molding axis (M);

A movable apparatus (60) including a carriage (61) and at least one oblong core (64A, 64B) bearing the imprint of an inner face (65) of the body (15) of the preform (2), with the carriage (61) being mounted to move in relation to the frame (19) between:

A molding position in which the core (64A, 64B) is housed in the mold body (29), and A demolding position in which the core (64A, 64B) is axially separated from the mold body (29), wherein the movable apparatus (60) also comprises:

A core holder (62) mounted on the carriage (61), with this core holder (62) carrying at least one primary core (64A) and one secondary core (64B) and being movable in rotation in relation to the carriage (61), in the demolding position of the latter, around an axis (R) of rotation that is parallel to the molding axis (M), between:

A first alignment position in which the primary core (64A) extends in the alignment of the mold body (29) while the secondary core (64B) is offset in relation to the mold body (29), and A second alignment position in which the primary core (64A) and the secondary core (64B) are transposed;

said unit (4) further comprising a pair of drawers (47), each carrying at least one neck half-ring (48) having an inner face (49) bearing the imprint of the neck (17) of a preform (2) and a tapered outer face (50), each drawer (47) being movable in relation to the mold holder (27) between a molding position in which the or each half-ring (48) is housed in a tapered reserve (35) formed projecting over the mold body (29), and a demolding position in which the or each half-ring (48) is separated from the tapered reserve (35); and said unit (4) further comprising a device (92) for uncovering each molded preform (2) in a demolding position of the core holder (62).

16. Molding unit (4) according to claim 8, further comprising a device (92) for uncovering each molded preform (2) in a demolding position of the core holder (62).

17. Molding unit (4) according to claim 10, further comprising a device (111) for gripping molded preforms (2) extracted from the core holder (62), with this gripping device (111) comprising a first comb (119) carrying at least a first jaw (120) and a second comb (121) carrying at least a second jaw (122) defining, with the first jaw (120), a clamp (123) for gripping a preform (2), with the combs (119, 121) being mounted to move in relation to one another between a gripping position in which the jaws (120, 122) are drawn toward one another, and a release position in which the jaws (120, 122) are separated.

* * * * *